US007260815B1

(12) United States Patent
Chen et al.

(10) Patent No.: US 7,260,815 B1
(45) Date of Patent: Aug. 21, 2007

(54) METHOD AND APPARATUS FOR MANAGING REGISTERS IN A BINARY TRANSLATOR

(75) Inventors: Xiaoxin Chen, Fremont, CA (US); Sahil Rihan, Mountain View, CA (US)

(73) Assignee: VMWare, Inc., Palo Alto, CA (US)

( * ) Notice: Subject to any disclaimer, the term of this patent is extended or adjusted under 35 U.S.C. 154(b) by 562 days.

(21) Appl. No.: 10/610,218

(22) Filed: Jun. 30, 2003

(51) Int. Cl.
*G06F 9/44* (2006.01)
(52) U.S. Cl. .................... 717/134; 717/124; 717/127; 717/136; 717/138; 717/139
(58) Field of Classification Search ............... 717/145, 717/124–139; 711/202–203, 209; 703/21–26; 712/209
See application file for complete search history.

(56) References Cited

U.S. PATENT DOCUMENTS

| 5,790,825 A | * | 8/1998 | Traut ......................... 712/209 |
| 5,953,520 A | * | 9/1999 | Mallick ...................... 703/26 |
| 5,995,743 A | * | 11/1999 | Kahle et al. ................. 703/21 |
| 6,895,491 B2 | * | 5/2005 | Kjos et al. ................... 711/203 |
| 2004/0064668 A1 | * | 4/2004 | Kjos et al. ................... 711/202 |
| 2005/0273313 A1 | * | 12/2005 | Carroll et al. ................ 703/26 |

* cited by examiner

*Primary Examiner*—Meng-Al T. An
*Assistant Examiner*—Mark P. Francis
(74) *Attorney, Agent, or Firm*—Darryl A. Smith

(57) ABSTRACT

The invention relates to managing registers during a binary translation mode in a virtual computing system. A set of registers is saved to memory before beginning to execute a series of blocks of translated code, and the contents of the set of registers are restored from memory later. A status register is maintained for tracking the status of each register within the set, the status indicating whether the contents are valid and whether the contents are saved in memory. Before the execution of each block, a determination is made as to whether the actions taken within the block relative to the registers are compatible with the current status of the registers. If the actions are not compatible, additional registers are saved to memory or restored from memory, so that the translation block can be executed.

37 Claims, 11 Drawing Sheets

| | | | |
|---|---|---|---|
| GR1 | 64-BIT DATA | 121A | NAT | 121B |
| GR2 | 64-BIT DATA | 122A | NAT | 122B |
| GR3 | 64-BIT DATA | 123A | NAT | 123B |
| GR4 | 64-BIT DATA | 124A | NAT | 124B |
| GR5 | 64-BIT DATA | 125A | NAT | 125B |
| GR6 | 64-BIT DATA | 126A | NAT | 126B |
| GR7 | 64-BIT DATA | 127A | NAT | 127B |
| GR8 | 64-BIT DATA | 128A | NAT | 128B |
| GR9 | 64-BIT DATA | 129A | NAT | 129B |
| ⋮ | | | | |
| GR15 | 64-BIT DATA | 135A | NAT | 135B |
| GR16 | 64-BIT DATA | 136A | NAT | 136B |
| GR17 | 64-BIT DATA | 137A | NAT | 137B |
| GR18 | 64-BIT DATA | 138A | NAT | 138B |
| GR19 | 64-BIT DATA | 139A | NAT | 139B |
| GR20 | 64-BIT DATA | 140A | NAT | 140B |
| GR21 | 64-BIT DATA | 141A | NAT | 141B |
| GR22 | 64-BIT DATA | 142A | NAT | 142B |
| GR23 | 64-BIT DATA | 143A | NAT | 143B |
| GR24 | 64-BIT DATA | 144A | NAT | 144B |
| ⋮ | | | | |
| GR31 | 64-BIT DATA | 151A | NAT | 151B |

BANK 1 = GR16–GR31 (above)

| | | | |
|---|---|---|---|
| GR16 | 64-BIT DATA | 36A | NAT | 36B |
| GR17 | 64-BIT DATA | 37A | NAT | 37B |
| GR18 | 64-BIT DATA | 38A | NAT | 38B |
| GR19 | 64-BIT DATA | 39A | NAT | 39B |
| GR20 | 64-BIT DATA | 40A | NAT | 40B |
| GR21 | 64-BIT DATA | 41A | NAT | 41B |
| GR22 | 64-BIT DATA | 42A | NAT | 42B |
| GR23 | 64-BIT DATA | 43A | NAT | 43B |
| GR24 | 64-BIT DATA | 44A | NAT | 44B |
| ⋮ | | | | |
| GR31 | 64-BIT DATA | 51A | NAT | 51B |

BANK 0 = GR16–GR31

FIG. 4

GR GLOBAL VALUE STATUS

| STATUS | NOTATION |
|---|---|
| VALID & SAVED | (V,S) = (1,1) |
| VALID & !SAVED | (V,S) = (1,0) |
| !VALID & SAVED | (V,S) = (0,1) |

FIG. 6A

TB GLOBAL VALUE ACTIONS

| ACTION | DEFINITION |
|---|---|
| USE | USE GLOBAL VALUE IN GR W/O PRIOR DEFINITION |
| DEFINE | INSERT NEW GLOBAL VALUE INTO GR |
| SCRATCH | USE GR AS LOCAL TB REGISTER |
| SAVE | SAVE GLOBAL VALUE TO MEMORY |

FIG. 6B

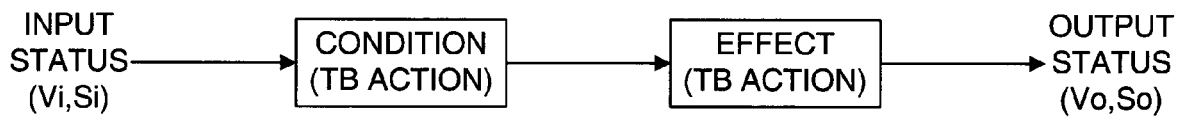

INPUT STATUS (Vi,Si) → CONDITION (TB ACTION) → EFFECT (TB ACTION) → OUTPUT STATUS (Vo,So)

FIG. 6C

| TB ACTION | CONDITION | EFFECT | OUTPUT |
|---|---|---|---|
| USE | Vi = 1<br>Si = X | NONE | Vo = 1<br>So = Si |
| DEFINE | Vi = X<br>Si = X | V = 1<br>S = 0 | Vo = 1<br>So = 0 |
| SCRATCH | Vi = X<br>Si = 1 | V = 0 | Vo = 0<br>So = 1 |
| SAVE | Vi = 1<br>Si = X | S = 1 | Vo = 1<br>So = 1 |

FIG. 6D

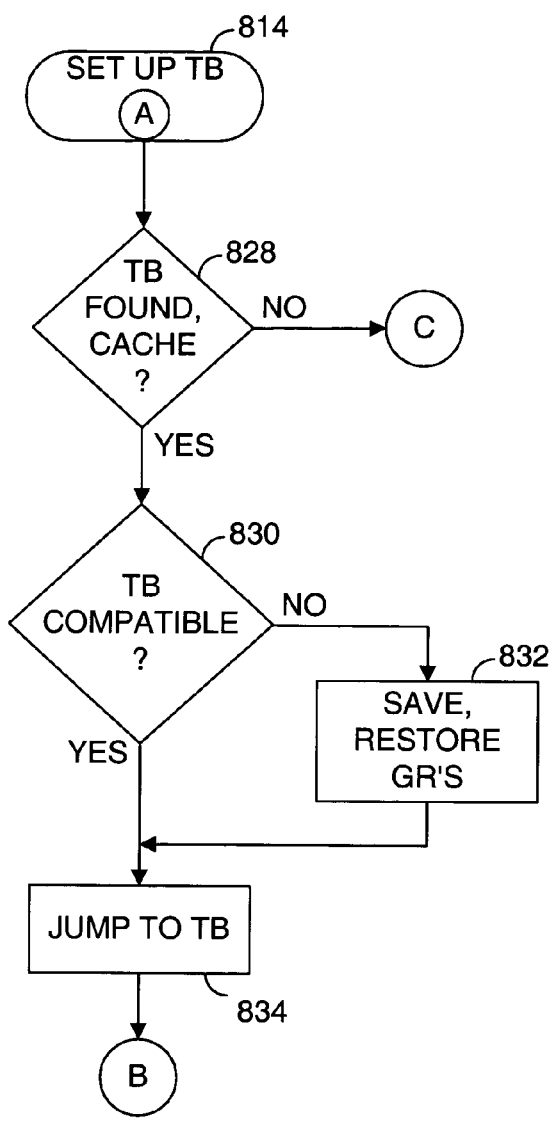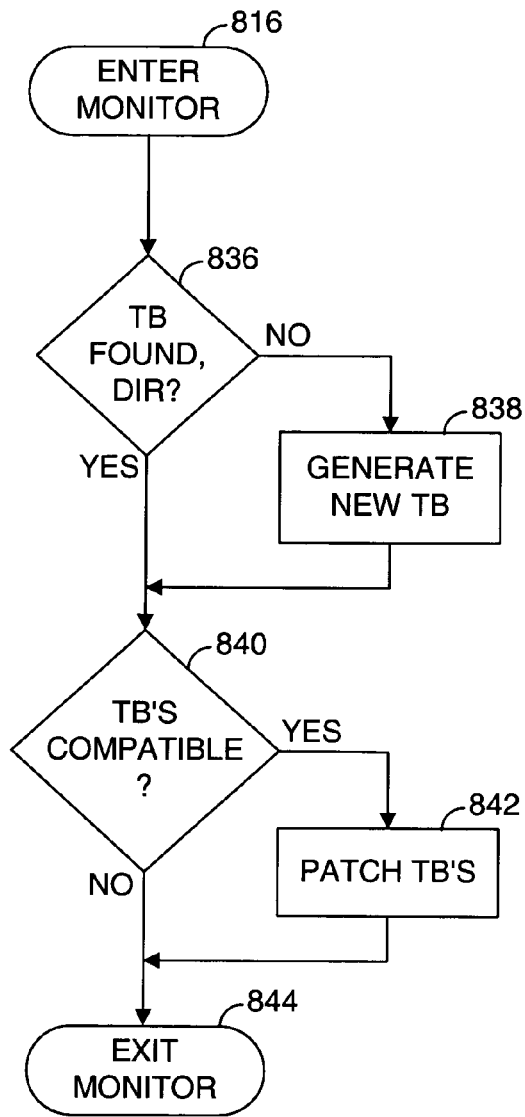
FIG. 8B  FIG. 8C

METHOD AND APPARATUS FOR MANAGING REGISTERS IN A BINARY TRANSLATOR

BACKGROUND OF THE INVENTION

1. Field of the Invention

This invention relates to the field of virtual machines for computer systems.

2. Description of the Related Art

The preferred embodiment of the invention is described relative to a binary translator for a virtual computer system. Consequently, this description begins with an introduction to virtual computing.

Virtualization has brought many advantages to the world of computers. As is well known in the art, a virtual machine (VM) is a software abstraction—a "virtualization"—of an actual physical computer system that runs as a "guest" on an underlying "host" hardware platform. As long as a suitable interface is provided between the VM and the host platform, one advantage is that the operating system (OS) in the guest need not be the same as the OS at the system level in the host. For example, applications that presuppose a Microsoft Windows OS can be run in the VM even though the OS used to handle actual I/O, memory management, etc., on the host might be Linux.

It usually requires less than 10% of the processing capacity of a CPU to run a typical application, although usage may peak briefly for certain operations. Virtualization can more efficiently use processing capacity by allowing more than one VM to run on a single host, effectively multiplying the number of "computers" per "box." Depending on the implementation, the reduction in performance is negligible, or at least not enough to justify separate, dedicated hardware "boxes" for each user.

Still another advantage is that different VMs can be isolated from and completely transparent to one another. Indeed, the user of a single VM will normally be unaware that he is not using a "real" computer, that is, a system with hardware dedicated exclusively to his use. The existence of the underlying host will also be transparent to the VM software itself. The products of VMware, Inc., of Palo Alto, Calif. provide all of these advantages in that they allow multiple, isolated VMs, which may (but need not) have OSs different from each other's, to run on a common hardware platform.

Example of a Virtualized System

FIG. 1 illustrates the main components of a system that supports a virtual machine as implemented in the Workstation product of VMware, Inc. As in conventional computer systems, both system hardware 100 and system software 200 are included. The system hardware 100 includes CPU(s) 102, which may be a single processor, or two or more cooperating processors in a known multiprocessor arrangement. The system hardware also includes system memory 104, one or more disks 106, and some form of memory management unit (MMU) 108. As is well understood in the field of computer engineering, the system hardware also includes, or is connected to, conventional registers, interrupt-handling circuitry, a clock, etc., which, for the sake of simplicity, are not shown in the figure.

The system software 200 either is or at least includes an operating system OS 220, which has drivers 240 as needed for controlling and communicating with various devices 110, and usually with the disk 106 as well. Conventional applications 260, if included, may be installed to run on the hardware 100 via the system software 200 and any drivers needed to enable communication with devices.

As mentioned above, the virtual machine (VM) 300—also known as a "virtual computer"—is a software implementation of a complete computer system. In the VM, the physical system components of a "real" computer are emulated in software, that is, they are virtualized. Thus, the VM 300 will typically include virtualized ("guest") system hardware 301, which in turn includes one or more virtual CPUs 302 (VCPU), virtual system memory 304 (VMEM), one or more virtual disks 306 (VDISK), and one or more virtual devices 310 (VDEVICE), all of which are implemented in software to emulate the corresponding components of an actual computer.

The VM's system software 312 includes a guest operating system 320, which may, but need not, simply be a copy of a conventional, commodity OS, as well as drivers 340 (DRVS) as needed, for example, to control the virtual device(s) 310. Of course, most computers are intended to run various applications, and a VM is usually no exception. Consequently, by way of example, FIG. 1 illustrates one or more applications 360 installed to run on the guest OS 320; any number of applications, including none at all, may be loaded for running on the guest OS, limited only by the requirements of the VM.

Note that although the hardware "layer" 301 will be a software abstraction of physical components, the VM's system software 312 may be the same as would be loaded into a hardware computer. The modifier "guest" is used here to indicate that the VM, although it acts as a "real" computer from the perspective of a user, is actually just computer code that is executed on the underlying "host" hardware and software platform 100, 200. Thus, for example, I/O to the virtual device 310 will actually be carried out by I/O to the hardware device 110, but in a manner transparent to the VM.

If the VM is properly designed, then the applications (or the user of the applications) will not "know" that they are not running directly on "real" hardware. Of course, all of the applications and the components of the VM are instructions and data stored in memory, just as any other software. The concept, design and operation of virtual machines are well known in the field of computer science. FIG. 1 illustrates a single VM 300 merely for the sake of simplicity; in many installations, there will be more than one VM installed to run on the common hardware platform; all will have essentially the same general structure, although the individual components need not be identical.

Some interface is usually required between the VM 300 and the underlying "host" hardware 100, which is responsible for actually executing or having executed VM-related instructions and transferring data to and from the actual, physical memory 104. One advantageous interface between the VM and the underlying host system is often referred to as a virtual machine monitor (VMM), also known as a virtual machine "manager." Virtual machine monitors have a long history, dating back to mainframe computer systems in the 1960s. See, for example, Robert P. Goldberg, "Survey of Virtual Machine Research," IEEE Computer, June 1974, p. 54-45.

A VMM is usually a relatively thin layer of software that runs directly on top of a host, such as the system software 200, or directly on the hardware, and virtualizes the resources of the (or some) hardware platform. The VMM will typically include at least one device emulator 410, which may also form the implementation of the virtual device 310. The interface exported to the respective VM is usually such that the guest OS 320 cannot determine the presence of the VMM. The VMM also usually tracks and either forwards (to the host OS 220) or itself schedules and handles all requests by its VM for machine resources, as well as various faults and interrupts. FIG. 1 therefore illustrates an interrupt (including fault) handler 450 within the VMM. The general features of VMMs are well known and are therefore not discussed in further detail here.

In FIG. 1, a single VMM 400 is shown acting as the interface for the single VM 300. It would also be possible to include the VMM as part of its respective VM, that is, in each virtual system. Although the VMM is usually completely transparent to the VM, the VM and VMM may be viewed as a single module that virtualizes a computer system. The VM and VMM are shown as separate software entities in the figures for the sake of clarity. Moreover, it would also be possible to use a single VMM to act as the interface for more than one VM, although it will in many cases be more difficult to switch between the different contexts of the various VMs (for example, if different VMs use different guest operating systems) than it is simply to include a separate VMM for each VM. This invention works with all such VM/VMM configurations.

In some configurations, the VMM 400 runs as a software layer between the host system software 200 and the VM 300. In other configurations, such as the one illustrated in FIG. 1, the VMM runs directly on the hardware platform 100 at the same system level as the host OS. In such case, the VMM may use the host OS to perform certain functions, including I/O, by calling (usually through a host API—application program interface) the host drivers 240. In this situation, it is still possible to view the VMM as an additional software layer inserted between the hardware 100 and the guest OS 320. Furthermore, it may in some cases be beneficial to deploy VMMs on top of a thin software layer, a "kernel," constructed specifically for this purpose.

FIG. 2 illustrates yet another implementation, in which the kernel 700 takes the place of and performs the conventional functions of the host OS. Compared with a system in which VMMs run directly on the hardware platform, use of a kernel offers greater modularity and facilitates provision of services that extend across multiple virtual machines (for example, resource management). Compared with the hosted deployment, a kernel may offer greater performance because it can be co-developed with the VMM and be optimized for the characteristics of a workload consisting of VMMs.

As used herein, the "host" OS therefore means either the native OS 220 of the underlying physical computer, or whatever system-level software handles actual I/O operations, takes faults and interrupts, etc. for the VM. The invention may be used in all the different configurations described above.

Speed is a critical issue in virtualization—a VM that perfectly emulates the functions of a given computer but that is too slow to perform needed tasks is obviously of little good to a user. Ideally, a VM should operate at the native speed of the underlying host system. In practice, even where only a single VM is installed on the host, it is impossible to run a VM at native speed, if for no other reason than that the instructions that define the VMM must also be executed. Near native speed, is possible, however, in many common applications.

The highest speed for a VM is found in the special case where every VM instruction executes directly on the hardware processor. This would in general not be a good idea, however, because the VM should not be allowed to operate at the greatest privilege level; otherwise, it might alter the instructions or data of the host OS or the VMM itself and cause unpredictable behavior. Moreover, in cross-architectural systems, one or more instructions issued by the VM may not be included in the instruction set of the host processor. Instructions that cannot (or must not) execute directly on the host are typically converted into an instruction stream that can. This conversion process is commonly known as "binary translation."

U.S. Pat. No. 6,397,242 (Devine, et al., "Virtualization system including a virtual machine monitor for a computer with a segmented architecture"), which is incorporated herein by reference, describes a system in which the VMM includes a mechanism that allows VM instructions to execute directly on the hardware platform whenever possible, but that switches to binary translation when necessary. This allows for the speed of direct execution combined with the security of binary translation.

A virtualization system of course involves more than executing VM instructions—the VMM itself is also a software mechanism defined by instructions and data of its own. For example, the VMM might be a program written in C, compiled to execute on the system hardware platform. At the same time, an application 360 written in a language such as Visual Basic might be running in the VM, whose guest OS may be compiled from a different language.

There must also be some way for the VM to access hardware devices, albeit in a manner transparent to the VM itself. One solution would of course be to include in the VMM all the required drivers and functionality normally found in the host OS 220 to accomplish I/O tasks. Two disadvantages of this solution are increased VMM complexity and duplicated effort—if a new device is added, then its driver would need to be loaded into both the host OS and the VMM. In systems that include a host OS (as opposed to a dedicated kernel such as shown in FIG. 2), a much more efficient method has been implemented by VMware, Inc., in its Workstation product. This method is also illustrated in FIG. 1.

In the system illustrated in FIG. 1, both the host OS and the VMM are installed at system level, meaning that they both run at the greatest privilege level and can therefore independently modify the state of the hardware processor(s). For I/O to at least some devices, however, the VMM may issue requests via the host OS 220. To make this possible, a special driver VMdrv 242 is installed as any other driver within the host OS 220 and exposes a standard API to a user-level application VMapp 500. When the system is in the VMM context, meaning that the VMM is taking exceptions, handling interrupts, etc., but the VMM wishes to use the existing I/O facilities of the host OS, the VMM calls the driver VMdrv 242, which then issues calls to the application VMapp 500, which then carries out the I/O request by calling the appropriate routine in the host OS.

In FIG. 1, the vertical line 600 symbolizes the boundary between the virtualized (VM/VMM) and non-virtualized (host software) "worlds" or "contexts." The driver VMdrv 242 and application VMapp 500 thus enable communication between the worlds even though the virtualized world is essentially transparent to the host system software 200.

Execution Modes: Direct Execution, Binary Translation and Interpretation

As described above, the VM 300 is a software implementation of a complete computer system. The guest system software 312, including the guest OS 320, and the applications 360 may be loaded onto the VM 300 and executed, just as if the VM 300 were a "real", physical computer system. In supporting the VM 300, the VMM 400 must enable the execution of VM instructions or emulate the execution of VM instructions (also referred to as guest instructions), including instructions from the guest system software 312 and the applications 360. The methods by which guest instructions are executed or emulated are referred to as execution modes of the VMM 400. The system described herein includes three distinct execution modes.

One mode—the direct execution mode—is described above and is well known in the art of virtualization: In the direct execution mode, VM instructions are executed directly on the host hardware processor, since they cannot affect any sub-system or access any memory, register, etc., that is off-limits to the VM. Direct execution is fast, because there is no need for intermediate processing in the VMM. The VMM therefore includes any known direct execution engine 460 to perform this function.

Binary translation is also mentioned above: A VM instruction (or instruction stream) cannot be allowed to execute as is for any of several reasons, for example, it attempts to access the VMM, or assumes a privilege level higher than the user level the VM runs at. Although possible, the VMM preferably detects the need for binary translation not by examining each VM instruction before it is to be executed, but rather by detecting exceptions, interrupts, etc., that arise from attempted execution of instructions that cannot be directly executed. The VMM itself establishes many of the mechanisms used to generate these exceptions, for example, using memory tracing; other interrupts will be raised by the underlying system software.

In the binary translation mode, a binary translation engine 462 in the VMM checks a translation cache 463 to determine whether there is an existing translation of the instruction (or instruction stream) into a form that is "safe" to pass to the hardware processor for execution. If there is such a translation, then the translation is executed. If there is not yet a translation, for example, the first time the instruction is encountered, the first time it traps, etc., then the binary translation engine generates one.

Alternatively, the VM instruction (or stream) under consideration can be passed to a conventional interpreter 464, which emulates the execution of the VM instruction(s) in software. Note that interpretation is usually cheaper than binary translation in terms of processing cycles required, but that binary translation will be much faster if a translation already exists in the cache 463—the translation can be used more than once.

CPU Registers and Binary Translation

This invention relates to the use of registers within the CPU 102 during the binary translation mode. As described above, binary translation involves translating one or more guest instructions into one or more target instructions that are safe for execution on the system hardware 100. The target instructions will generally use many of the same registers as the guest instructions. For example, if a guest instruction loads a value from a memory location addressed by the contents of a first register R1 into a second register R2, the target instructions resulting from a binary translation will typically use the same registers for the same purposes. The target instructions will typically expect to find the address for the operand in the register R1 and will typically be expected to load the operand into the register R2. The target instructions may also use additional registers, which are not used by the guest instructions, for intermediate values and for other purposes. These registers are referred to as scratch registers. Typically, a scratch register is used for a short period of time for temporary storage of an intermediate value. In some embodiments of the invention, a scratch register is used only within a single block of translated instructions, so that there will be no dependence on the value in the scratch register outside of that block of translated instructions.

As an example of the use of scratch registers, suppose the guest software includes the following instruction:

(qp) mov r1=cr3

The VMM 400 emulates the function of the control register cr3, using a location in memory to store the current value of the register, as seen within the VM 300. Thus, the VMM writes a value to the selected memory location when the register cr3 is to be loaded with a value and reads a value from the selected memory location when the register cr3 is to be read. Suppose further that a base address for the VMM has already been loaded into a scratch register sr0. The base address may be retained in the register sr0 throughout the execution of the block of translated code. Under these circumstances, the above instruction may be translated into the following sequence of instructions:

movl sr1=addr;;
add sr1=sr0,sr1 ;;
ld8 r1=[sr1]

The variable "addr" is the virtual address for the memory location that holds the value of the virtual guest register cr3, or the offset from the VMM base address to the virtual guest register cr3. The registers sr0 and sr1 are used as scratch registers. The contents of the scratch register sr1 typically would not be used outside this sequence of instructions.

A binary translator must be careful in its use of scratch registers, however. In the virtual computing system described herein, the VMM 400 switches back and forth between direct execution mode and binary translation mode. Suppose the VMM executes a first set of guest instructions in direct execution mode. Suppose next that an exception occurs that causes the VMM to switch to binary translation mode, just before a second set of guest instructions was to be executed. Suppose that the second set of guest instructions is translated, using binary translation, into a first set of target instructions, so that the first set of target instructions is executed next. Suppose that, after executing the first set of target instructions, the VMM switches back to direct execution mode for execution of a third set of guest instructions.

Now suppose that the first set of guest instructions writes a first value into the first register R1. Suppose further that an instruction in the third set of guest instructions relies on the first value being loaded into the first register when the third set of guest instructions is executed. Now, when the binary translator generates the first set of target instructions, based on the second set of guest instructions, the translator must ensure that the first register contains the first value after execution of the target instructions. Suppose that the translator needs to use a scratch register for some purpose within the second set of target instructions. If the translator were to use the register R1, without any remedial actions, the contents of the register R1 would typically be overwritten when the target instructions are executed, and the first value would not be available to the third set of guest instructions.

Of course, the translator could choose to use a different register, instead of the register R1. This implies, however, that the translator can determine another register that is available for use as a scratch register. First, there may not be a register that is available for use, and, even if there is a register available for use, it may not be easy for the translator to determine which register(s) are currently available.

Another possible remedial action would be to add instructions to the set of target instructions that save the contents of the first register R1 to memory before using the register as a scratch register, and return the first value from memory to the first register R1 before returning to direct execution mode for execution of the third set of guest instructions.

In some architectures, however, saving the first register R1 to memory in the first place may be problematic. Some architectures permit only indirect memory addressing, instead of allowing immediate addresses to be used to specify a memory location. This means that a second register must be used to save the first register R1 to memory. Now, the same dilemma arises as to which register, if any, can be used for the indirect memory addressing.

Also, as indicated above, speed is a critical issue in virtualization. Of course, it takes time to store register values into memory before executing target instructions that emulate the corresponding guest instructions, and restoring the values into the registers after the target instructions have been executed. In some situations, the string of target instructions required to emulate a set of guest instructions may be small relative to the instructions required to save and restore register values. In addition, such target instructions may be executed frequently. Consequently, saving and restoring register values during the binary translation mode may be relatively expensive in terms of execution time. Also, methods for determining which registers are available for use as scratch registers can also differ substantially in terms of consuming processing resources.

What is needed therefore is an efficient method and apparatus for managing registers in a binary translator, enabling one or more of the registers to be used as scratch registers by target instructions, while maintaining the integrity of the contents of each of the registers during and after the execution of the target instructions. Such a method and apparatus is needed, in particular, for an architecture that permits only indirect memory addressing. This invention provides such a method and apparatus.

SUMMARY OF THE INVENTION

One embodiment of the invention implements a method of executing a first block of one or more translated instructions followed by a second block of one or more translated instructions during a binary translation mode of a virtual computer system, where the second block of translated instructions corresponds to a second set of one or more guest instructions that is due to be executed immediately after a first set of one or more guest instructions that corresponds to the first block of translated instructions. This method comprises the steps of executing the first block of translated instructions; determining a status for one or more registers within a set of registers; identifying a dependency between one or more actions that are performed within the second block of translated instructions and the status of one or more registers within the set of registers, so that the validity of the contents of the one or more registers may be corrupted if the second block of translated instructions is executed when the dependency is not satisfied; if the dependency is not satisfied, taking an action relative to one or more of the registers to alter the status of the registers to a state that satisfies the dependency; and executing the second block of translated instructions.

Another embodiment of the invention implements a method of emulating guest instructions using binary translation in a virtual computer system, the virtual computer system having a binary translation mode and a direct execution mode, the virtual computer system switching from the direct execution mode to the binary translation mode in response to an interruption, the computer system permitting only indirect memory addressing when saving registers to memory, the computer system having a first set of registers that has two banks, with a first bank generally being active when the computer system is executing an interrupt handler and a second bank generally being active at other times, and a second set of registers having only a single bank. The method includes a first step of, in response to an interruption that causes a switch from direct execution mode to binary translation mode, while the computer system is still executing the interrupt handler and the first bank of the first set of registers is still active, using one or more of the registers from the first set of registers for address indirection and saving to memory one or more of the registers from the second set of registers. This first step may be performed by a sequence of instructions, with each instruction from the sequence saving a single register to memory, and with the execution of each instruction depending on a predefined condition. A second step involves performing the following steps one or more times to execute one or more blocks of translated code: identifying a translation block as the next translation block to be executed; determining one or more dependencies of the next translation block relating to whether the contents of one or more registers are valid or whether the contents of one or more registers are saved to memory; if a dependency of the next translation block is not satisfied, saving one or more registers to memory or restoring one or more registers from memory to satisfy the dependency; and executing the next translation block. A third step of the method involves returning to direct execution mode.

Another embodiment of the invention is implemented in a computer program embodied in a tangible medium, the computer program being executable in a virtual computer system to execute binary translation code to emulate the execution of guest code, the computer system comprising a set of registers. The computer program comprises a plurality of translation blocks of translated code and a translation block execution routine. The execution routine performs the following functions to execute binary translation code: identifying a next translation block to be executed; determining a dependency between actions that are performed within the next translation block to be executed and the set of registers; determining whether a current state of the set of registers satisfies the dependency; if the current state of the set of registers does not satisfy the dependency, taking one or more actions with respect to one or more of the registers to alter the current state of the set of registers to satisfy the dependency; and executing the next translation block.

Another embodiment of the invention is also implemented in a computer program embodied in a tangible medium, the computer program also being executable in a virtual computer system to emulate the execution of guest instructions, the computer system also comprising a set of registers. The computer program comprises a first translation block of translated code and a second translation block of translated code. The first translation block is to be executed, followed by the second translation block. The first translation block contains instructions for performing the following functions: emulating one or more guest instructions; updating a status of the contents of the set of registers based on actions taken within the first translation block; determining a dependency between one or more actions to be taken in the second translation block and the status of the contents of the set of registers; and if the dependency is satisfied by the status of the contents of the registers, proceeding to the second translation block for execution. The second translation block emulates one or more additional guest instructions.

Yet another embodiment of the invention is also implemented in a computer program embodied in a tangible medium, the computer program being executable in a virtual computer system to emulate the execution of guest instructions, the computer system comprising a set of registers. The computer program comprises a translation block execution routine, a first translation block of translated code and a second translation block of translated code. The first translation block contains instructions for performing the following functions: emulating one or more guest instructions; updating a status of the contents of the set of registers based on actions taken within the first translation block; and proceeding to the second translation block for execution. The second translation block emulates one or more additional guest instructions. Also, the execution routine contains instructions for determining whether to execute the first translation block followed by the second translation block or whether to execute only the second translation block. The execution routine further contains instructions for performing the following functions, if a determination is made to execute the first and second translation blocks: determining a first dependency between one or more actions to be taken in the first or second translation blocks and the status of the contents of the set of registers and if the first dependency is satisfied by the status of the contents of the registers, proceeding to the first translation block for execution. The execution routine also contains instructions for performing the following functions, if a determination is made to execute only the second translation block: determining a second dependency between one or more actions to be taken in the second translation block and the status of the contents of the set of registers and if the second dependency is satisfied by the status of the contents of the registers, proceeding to the second translation block for execution.

Another embodiment of the invention is implemented in a method of emulating guest instructions using binary translation in a virtual computer system. The virtual computer system has a binary translation mode and a direct execution mode. The computer system permits only indirect memory addressing when saving registers to memory, and the computer system has a trappable register for which an attempted access may be trapped. The method comprises: during direct execution mode, setting up a trap that is activated upon guest software attempting to access the trappable register and, upon activation of the trap, emulating the trappable register so that the guest software does not have access to the trappable register, but the guest software is executed as if it had access to the trappable register; upon switching from direct execution mode to binary translation mode, using the trappable register for address indirection to save a second register to memory; and during binary translation mode, executing a block of translated code and using the second register as a scratch register during the execution of the block of translated code.

BRIEF DESCRIPTION OF THE DRAWINGS

FIG. 4 illustrates some of the general registers of the Intel IA-64 architecture.

FIG. 6A illustrates possible global value status values for the general registers, as well as a notation that is used to indicate the status values.

FIG. 6B illustrates possible actions that may be taken within a translation block that may affect a global value in a general register.

FIG. 6C illustrates a general relation between the global value status of a general register when entering a translation block, a global value action that is taken within the translation block, and the global value status of the general register upon exiting the translation block.

FIG. 6D further illustrates the general relation between the global value status of a general register when entering a translation block and the global value status of the general register upon exiting the translation block, for each of four possible actions that may be taken within the translation block.

FIG. 8B illustrates a method of setting up to execute a translation block during the method of FIG. 8A.

FIG. 8C illustrates a method that is performed by a monitor code unit during the method of FIG. 8A, when the VMM is in the binary translation mode.

DETAILED DESCRIPTION

Figure 1:
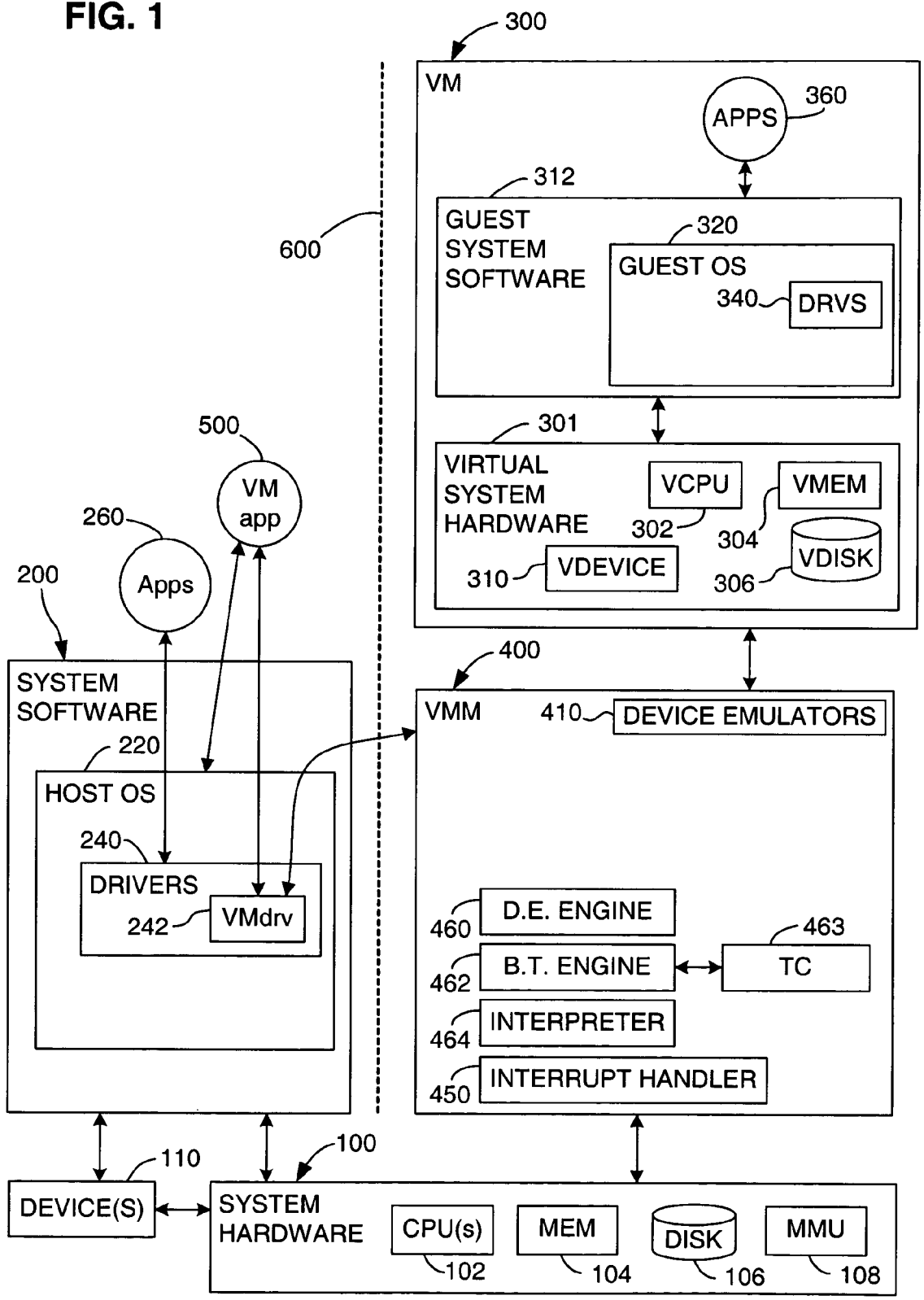
FIG. 1 illustrates a virtual computer system installed on a host platform, with a virtual machine monitor (VMM) at the same system level as the host operating system.
Figure 2:
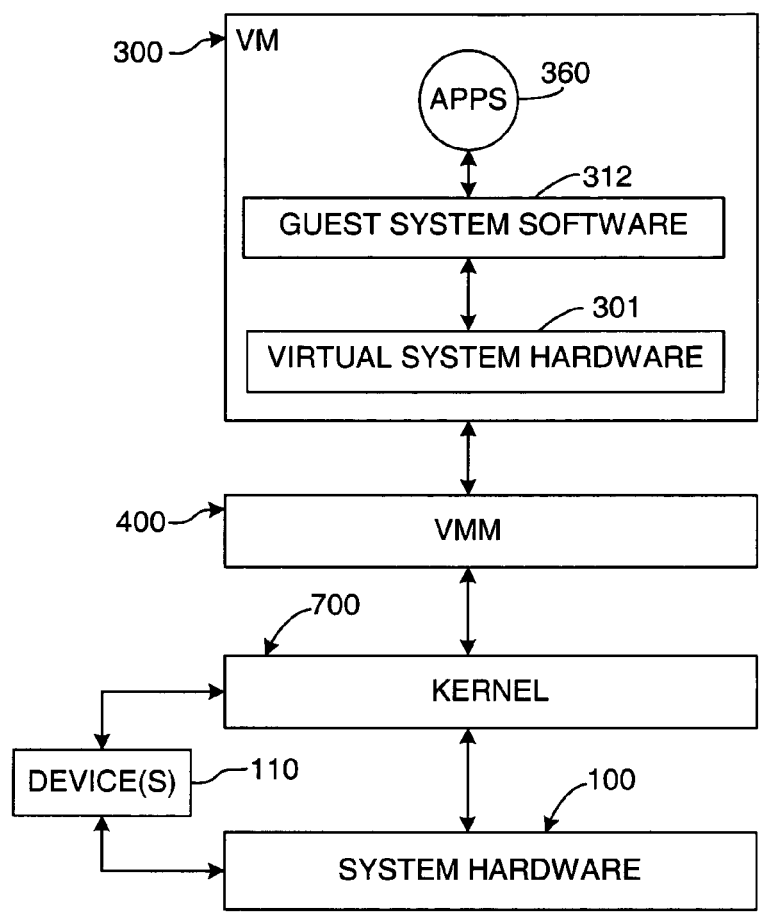
FIG. 2 illustrates an alternative configuration of a virtual computer system, which includes a kernel on which the VMM runs.

In broad terms, the invention relates to a method and apparatus for managing registers in a virtual computing system, when the system is operating in a binary translation mode. A binary translator generates a plurality of translation blocks containing target instructions that, when executed, emulate corresponding guest instructions. Thus, a first set of one or more guest instructions is translated into a first translation block, containing a first set of one or more target instructions, a second set of one or more guest instructions is translated into a second translation block, containing a second set of one or more target instructions, and so on. When a particular set of guest instructions is due to be executed in the VM, the corresponding translation block may be executed instead, to emulate the execution of the guest instructions. When one or more translation blocks are to be executed in binary translation mode, the contents of one or more registers are saved to memory, to be restored later, so that the registers can be used as scratch registers by target instructions in the translation blocks. Information regarding the status of the registers is maintained and/or determined. This information is used to determine a register's availability for use as a scratch register, as well as determining whether the register contains valid data that may be used within a translation block. Before executing a subsequent translation block, a determination is made regarding whether the translation block may be executed, given the registers that are currently available for scratch registers, the scratch registers that are needed by the translation block, the registers that currently have valid data, and the registers for which valid data is required. If the translation block cannot be executed, based on the currently available registers, additional registers may be saved to memory or restored from memory, so that the translation block may be executed. However, if the translation block can be executed, based on the current status of the registers, then the translation block is executed, without having to save or restore any registers.

The preferred embodiment of the invention is described relative to a virtual computer system, in which a VM having an IA-64 architecture is virtualized on top of a physical hardware system that is also based on the IA-64 architecture. The invention may also be implemented in different forms on other virtual computer systems, having different architectures for the VM, the physical hardware, or both, including cross platform implementations. The invention may also be implemented in computer systems having just one processor, or in computer systems having more than one processor.

VM/VMM Code Types

As described above, the VMM of the virtual computing system described herein has three different execution modes, namely direct execution, binary translation and interpretation. These execution modes indicate the method by which guest instructions are being either executed or emulated. In the direct execution mode, guest instructions are directly executed on the CPU 102. In the binary translation mode, guest instructions are emulated by translating them into a set of target instructions, which are directly executed on the CPU 102. In the interpretation mode, guest instructions are emulated directly in software.

A distinction is drawn between these three execution modes on one hand and, on the other hand, the different types of code that are executed at different times when the virtual computing system is in the virtualized context. When the VMM is in direct execution mode, guest instructions are being directly executed by the CPU 102. When the VMM is in interpretation mode, a high-level computer program that is referred to as "monitor code" is executed. In one commercial embodiment of the VMM 400, the monitor code is written in the C programming language. The monitor code forms the bulk of the VMM 400 and performs numerous different functions, with one of these functions being the interpretation of guest instructions. Thus, when the VMM is in interpretation mode, the monitor code emulates the execution of one or more guest instructions directly in software. When the VMM is in binary translation mode, the CPU 102 may be executing high-level monitor code, or it may be executing target code resulting from the translation of guest instructions or other low-level code closely related to the execution of target code. Still other code, such as interrupt handler code, is executed at various other times while the virtual computing system is in the virtualized context. For example, if the VMM is in the direct execution mode and an interruption occurs that requires a transition to the monitor code, an interruption handler will execute, facilitating the required transition to the monitor code.

Binary Translation Mode

Figure 3:
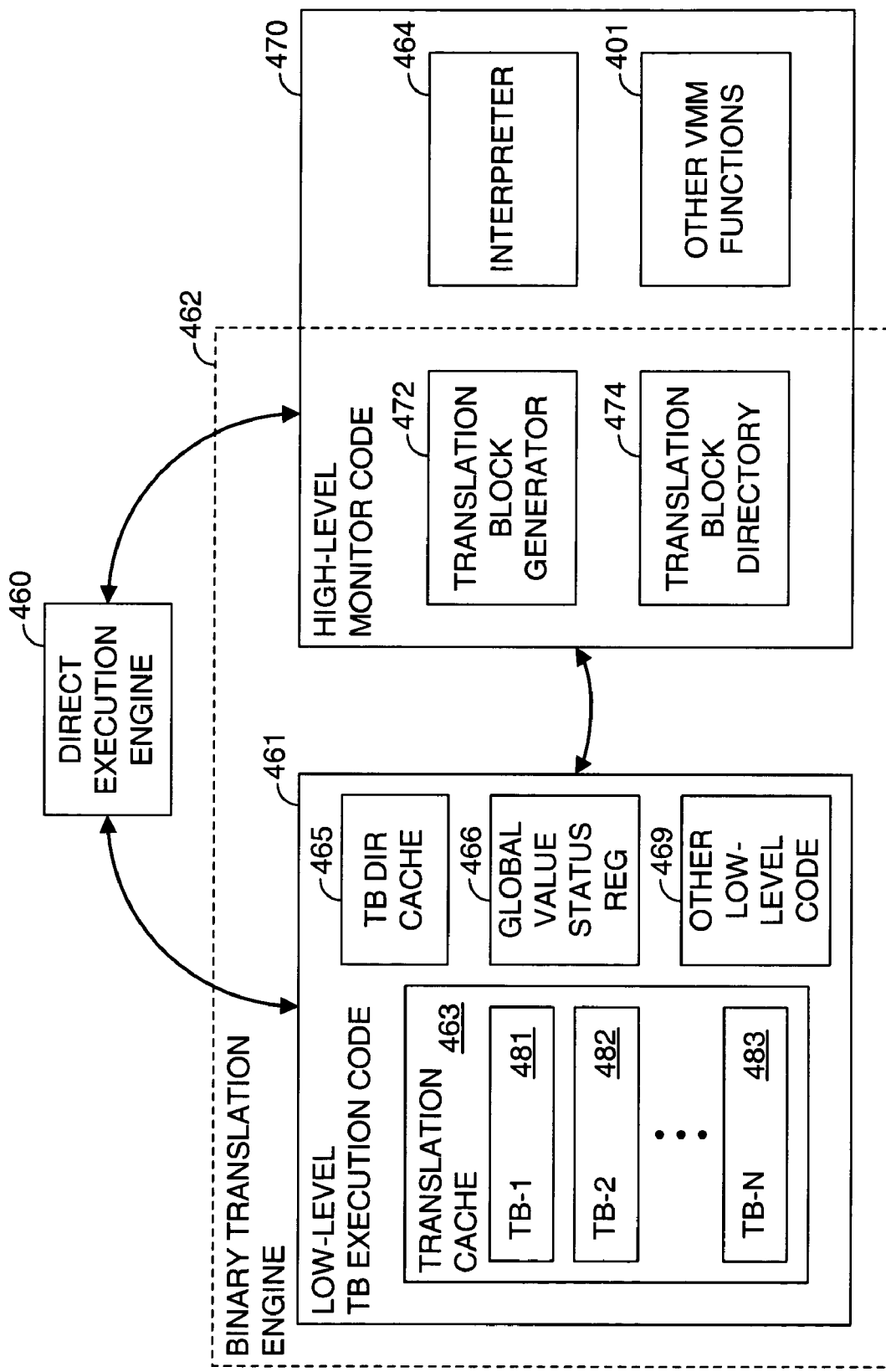
FIG. 3 illustrates a direct execution engine, a low-level translation block execution code unit and a high-level monitor code unit of one embodiment of a VMM.

FIG. 3 illustrates interactions between the direct execution (DE) engine 460, the high-level monitor code 470 and a low-level translation block (TB) execution code 461. The monitor code 470 comprises a TB generator 472, a TB directory 474, the interpreter 464 and other VMM functions 401. The TB execution code 461 comprises the translation cache 463, including a plurality of translation blocks 481, 482 and 483, a TB directory cache 465, a global value status register 466 and other low-level code 469.

Suppose the VMM is operating in direct execution mode when an interruption occurs. Depending on the type of interruption and the situation at the time of the interruption, the VMM may switch to either binary translation mode or interpretation mode. Suppose that the interruption causes the VMM to switch to binary translation mode. This means that the VMM will now execute one or more translation blocks that correspond to the next guest instructions to be executed.

First, the interruption causes the CPU 102 to begin executing an interrupt handler routine, which is a part of the low-level TB execution code 461. Then the TB execution code first checks the TB directory cache 465 in an attempt to determine if there is a TB that corresponds to the next guest instruction(s) to be executed. The TB directory cache contains information regarding a number of TB's that have been executed recently. The TB directory cache contains an entry for each of these recently executed TB's, each entry comprising a source key and a pointer to the corresponding TB in the translation cache 463. The source key for a TB includes the instruction pointer (IP) value within the VM that corresponds with the first guest instruction to which the TB corresponds. The source key may also include the physical page number and/or the region identifier for this first guest instruction.

In addition, the source key may include a set of flag values. Including flag values allows for multiple TB's corresponding to a particular first guest instruction. In this case, each source key for the multiple TB's corresponding to a single guest instruction will have a different combination of flag settings. The different combinations of flag settings correspond to different execution settings. For example, one TB may be for when exceptions are deferred, while another TB may be for when the VM is running with an incomplete register stack frame. A TB that corresponds to the next guest instruction to be executed is only executed if the flag settings for the TB are compatible with the current flag settings in the VM. Storing and comparing flag settings to help in the identification of TB's allows the TB's to be customized for the particular execution settings.

If the TB execution code 461 finds a TB, such as TB-1 481, for which the source key corresponds to the next guest instruction to be executed and that is compatible with the current execution setting, execution branches to that particular TB, and TB-1 is executed. After execution of TB-1, the VMM may continue to operate in binary translation mode, or it may switch to either direct execution mode or interpretation mode. If it remains in binary translation mode, the TB directory cache 465 is again consulted to try to find a TB that matches the new VM IP value and execution setting, where the VM IP value is updated based on the execution of TB-1. More specifically, the VM IP value is updated to point to the next guest instruction to be executed after the guest instruction(s) that correspond with the target instruction(s) in TB-1, possibly including a non-sequential branch within or at the end of TB-1. If a matching TB is found again, execution branches to that TB. This process continues until a matching TB is not found, or until the VMM switches out of binary translation mode. Thus, execution may jump from one TB to another within the translation cache 463, without leaving the TB execution code 461.

As another possibility, if the VMM remains in binary translation mode and no TB is found that matches the current VM IP value and execution setting, the VMM 400 switches execution from the TB execution code 461 to the high-level monitor code 470. The monitor code 470 consults the TB directory 474 for a TB that matches the current VM IP value and execution setting. The TB directory 474 is similar to the TB directory cache 465, except that it contains an entry, including a source key and a corresponding translation cache pointer, for every TB in the translation cache 463, instead of only the most recently used TB's. If a matching TB is found in the TB directory, the entry for the TB is copied to the TB directory cache. The VMM 400 switches execution back to the TB execution code 461, and the matching TB in the translation cache is executed.

If a matching TB is not found in the TB directory 474, then there is no TB that matches both the current VM IP value and the current execution setting. In this case, execution switches to the TB generator 472. The TB generator generates one or more new translation blocks, based on the current VM IP value and the current execution setting. The monitor code 470 places these new TB's into the translation cache 463 and creates entries for the TB's in both the TB directory 474 and the TB directory cache 465. Again, the VMM 400 switches execution back to the TB execution code 461, and the matching TB in the translation cache is executed.

This entire process continues until the VMM 400 switches from the binary translation mode to either the direct execution mode or the interpretation mode. While in the binary translation mode, execution may jump from TB to TB while executing in the TB execution code 461, and it may sometimes switch to the monitor code 470 to either help find matching TB's or to generate new TB's.

Scratch Registers

As described above, many TB's use one or more registers as scratch registers. Also, as described above, the binary translation (BT) engine 462 must be careful when using registers as scratch registers to ensure that the register contents are not corrupted for the execution or emulation of subsequent VM code, whether that subsequent execution or emulation is by binary translation, direct execution or interpretation. One possible approach to ensuring the integrity of the registers that are used as scratch registers involves saving all such registers to memory at the beginning of a TB and restoring the saved values to the registers at the end of the TB. This invention, however, uses a different, generally more efficient approach. Also, in some implementations, saving the register contents to memory during binary translation mode is not as easy as it sounds. For example, for the preferred embodiment described herein, involving the IA-64 architecture, saving the register contents to memory during binary translation mode is not a trivial task.

Suppose again that the VMM 400 is executing in direct execution mode when an interruption occurs that causes the VMM to switch to binary translation mode. When the VMM switches to binary translation mode, it switches to an unrelated section of code. In one embodiment of the VMM, all of the VM general registers are mapped into corresponding machine general registers, so that the VM code has complete control of the contents of all general registers. The code in the BT engine 462, when the interruption causes a switch to binary translation mode, does not know anything about the contents of the registers that might be used as scratch registers. In many virtual computing systems, a BT engine does not need to know anything about the contents of the registers, though. The BT engine can usually just save the contents of the registers to memory and restore the register contents later.

A problem arises, however, in some virtual computing systems, such as systems based on the IA-64 architecture. In the IA-64 architecture, memory references for saving the register contents may not be made by immediate operands. Instead, such memory references may only be made indirectly, by referencing a register that contains the address for the memory location to which the other register's contents are to be written. Thus, in the IA-64 architecture, to store the contents of a first register in memory, a second register must first be loaded with an address to which the contents of the first register are to be written. Next, an instruction issues to copy the contents of the first register to the memory location addressed by the contents of the second register. Thus, saving the contents of a register to memory first requires loading an address value into another register. However, when entering the binary translation mode, there is typically no way to know which, if any, of the registers may be used for the address indirection. In the example described above, there may be valid data in the second register that would be overwritten if the register were loaded with a memory address. There is no obvious way to begin the process of saving registers to memory, without risking writing over useful data.

IA-64 General Registers

The preferred embodiment of the invention uses one or more general registers (GR's) in the IA-64 architecture as scratch registers during the binary translation mode. General registers 1 through 31 (GR1 to GR31) are illustrated in FIG. 4. The GR's, and their operation, are thoroughly described in various Intel documents, including the Intel Itanium Architecture Software Developer's Manual, which is available from Intel, Corporation of Santa Clara, Calif. Each of the GR's 1 through 31 is a 64-bit register, and each GR includes an additional NaT (Not a Thing) bit. Also, for GR's 16 to 31, there are two banks of registers. Bank 0 is generally used during interrupt handling, and bank 1 is generally used at all other times. When an interruption occurs, bank 0 becomes active, and bank 1 becomes active again when the interrupt handler routine terminates. The register banks can be switched at other times too, but such switching is costly in terms of processing cycles. The NaT bits also complicate the process of saving registers to memory, as the NaT bits must also be saved and restored, along with the regular 64 bits of the registers.

FIG. 4 shows a General Register 1 (GR1) 121A having an NaT bit 121B, a GR2 122A having an NaT bit 122B, a GR3 123A having an NaT bit 123B, a GR4 124A having an NaT bit 124B, a GR5 125A having an NaT bit 125B, a GR6 126A having an NaT bit 126B, a GR7 127A having an NaT bit 127B, a GR8 128A having an NaT bit 128B, a GR9 129A having an NaT bit 129B, a GR15 135A having an NaT bit 135B, a Bank 1 GR16 136A having an NaT bit 136B, a Bank 1 GR17 137A having an NaT bit 137B, a Bank 1 GR18 138A having an NaT bit 138B, a Bank 1 GR19 139A having an NaT bit 139B, a Bank 1 GR20 140A having an NaT bit 140B, a Bank 1 GR21 141A having an NaT bit 141B, a Bank 1 GR22 142A having an NaT bit 142B, a Bank 1 GR23 143A having an NaT bit 143B, a Bank 1 GR24 144A having an NaT bit 144B, a Bank 1 GR31 151A having an NaT bit 151B, a Bank 0 GR16 36A having an NaT bit 36B, a Bank 0 GR17 37A having an NaT bit 37B, a Bank 0 GR18 38A having an NaT bit 38B, a Bank 0 GR19 39A having an NaT bit 39B, a Bank 0 GR20 40A having an NaT bit 40B, a Bank 0 GR21 41A having an NaT bit 41B, a Bank 0 GR22 42A having an NaT bit 42B, a Bank 0 GR23 43A having an NaT bit 43B, a Bank 0 GR24 44A having an NaT bit 44B, and a Bank 0 GR31 51A having an NaT bit 51B.

Initial Register Spill

One aspect of the invention involves a method for saving the contents of some of the general registers to memory during binary translation mode, so that the registers can be used as scratch registers. As mentioned above, one approach that has been used to make scratch registers available for use by target instructions in a block of translated code involves saving the registers at the beginning of each block and restoring the register contents at the end of each block. Under the invention, however, general registers are preferably saved to memory (or "spilled" to memory) before beginning the execution of a block of translated code. In particular, after an interruption occurs that causes the VMM to switch to binary translation mode, the TB execution code 461 spills general registers to memory during the interrupt handler routine, while bank 0 is still active.

Figure 5:
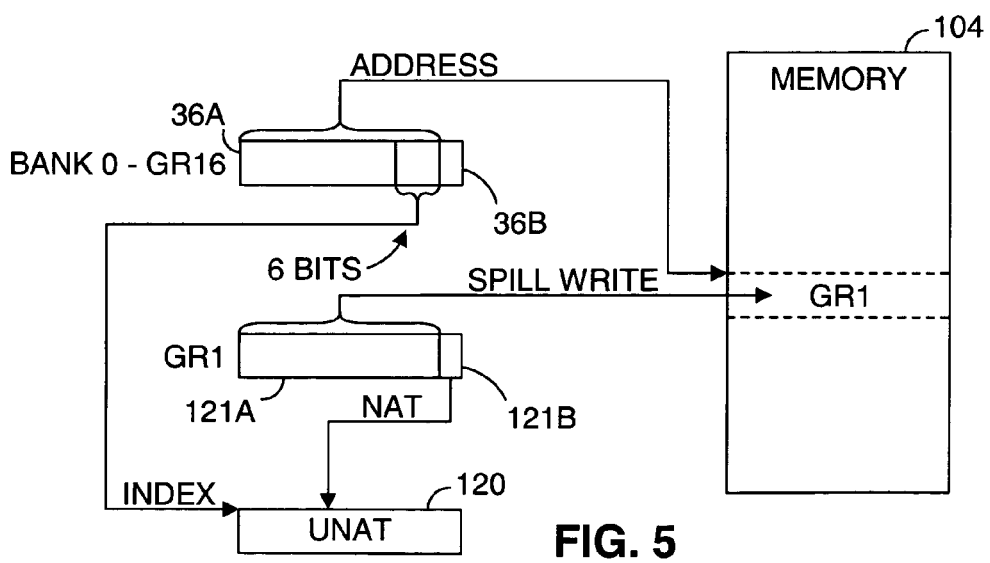
FIG. 5 illustrates a general method of spilling the contents of general registers to memory in the IA-64 architecture.

FIG. 5 illustrates the general method used in the preferred embodiment to spill GR's to memory. FIG. 5 shows Bank 0 GR16, GR1, a User NaT collection register (UNaT) 120, which is one of the application registers in the IA-64 architecture, and the memory 104. As described above, the bank 0 registers are generally only used by system software in interrupt handler routines. Also, it is assumed that interrupt handler routines can use these registers without corrupting VM data.

In addition, the VMM 400 ensures that guest software, including even interrupt handler routines, cannot access the bank 0 registers. The bank 0 registers can only be accessed at an elevated privilege level. However, the VM is not allowed to run at elevated privilege levels. The VMM emulates the bank 0 and bank 1 registers using memory locations. When the guest software expects to be using the bank 0 registers, the bank 0 values are loaded from memory into the bank 1 registers GR16 to GR31. When the guest software expects to be using the bank 1 registers, the bank 1 values are loaded from memory into the bank 1 registers GR1 6 to GR31. In either case, the VM accesses only the bank 1 registers. Alternatively, the VMM can emulate the execution of the instructions that attempt to access the bank 0 registers using either binary translation or interpretation.

Consequently, when an interruption occurs that causes execution to switch to binary translation mode, the TB execution code 461 is free to use the bank 0 registers while it is in the interruption context. The TB execution code loads a bank 0 register, such as bank 0 GR16, with an address for a memory location into which the contents of a general register are to be spilled. In anticipation of performing some register spill instructions, the TB execution code also saves the contents of the UNaT register into memory. The operation of the UNaT register is also described in the Intel document referenced above. Next, the TB execution code issues an instruction to spill the contents of GR1 to the memory location pointed to by bank 0 GR16. The spill instruction writes the 64-bit contents of GR1 into the memory location addressed by the contents of bank 0 GR16, and the NaT bit of GR1 is written to one of the bits in the UNaT register 120, as determined by bits 8 through 3 of the address in bank 0 GR16.

This solves the problem described above as to how to begin saving registers without corrupting any data in the registers. The contents of the bank 0 registers are not expected to be preserved upon an interruption, so these registers can be used for the indirect addressing. One or more of the bank 0 registers are used to save one or more of the registers GR1 to GR15 to memory. These registers GR1 to GR15 are then available for use as scratch registers. The UNaT register 120 is saved to memory because selected bits of the register will be overwritten by the spill instructions that are used to save the contents of the registers GR1 to GR15. The registers GR1 to GR15 are later "filled" from memory, which also copies the NaT bits from the appropriate bits of the UNaT register 120. The original contents of the UNaT register are subsequently restored from memory.

In the preferred embodiment of the invention, the TB execution code 461 spills some or all of the registers GR1 to GR15 to memory, using the bank 0 registers GR16 to GR 30. In particular, bank 0 GR16 is loaded with the memory address to which the register GR1 is to be spilled, bank 0 GR1 7 is loaded with the memory address to which the register GR2 is to be spilled, and so on, through bank 0 GR30 being loaded with the memory address to which the register GR15 is to be spilled. Also, different bits in a predicate register are selected to indicate whether corresponding general registers GR1 to GR15 are to be spilled. For example, bit 1 of a predicate register may be used to indicate whether GR1 is to be spilled, bit 2 may be used to indicate whether register GR2 is to be spilled, and so on, with a '1' being loaded into the respective bit to indicate that the corresponding register is to be spilled or a '0' being loaded to indicate that the register is not to be spilled. Next, the TB execution code includes a series of instructions that spill consecutive general registers from GR1 to GR15 to the memory locations addressed by the contents of consecutive general registers from bank 0 GR16 to bank 0 GR30, dependent on the corresponding predicate bits. Thus, if bit 1 of the predicate register is a '1', then the contents of GR1 are written to the memory location addressed by bank 0 GR16; if bit 2 of the predicate register is a '1', then the contents of GR2 are written to the memory location addressed by bank 0 GR17, and so on. In this manner, the same code can be used multiple times to spill different combinations of the registers GR1 to GR15, simply by writing different bit patterns to the predicate register.

In some embodiments of the invention, after the TB execution code 461 returns from the interrupt handler routine and bank 1 of registers GR16 to GR31 becomes active again, registers GR1 to GR15 may be used to save the contents of some or all of the bank 1 registers GR16 to GR 31, allowing these additional registers to also be used for scratch registers within TB's. The contents of other registers may also be saved in a similar manner. Whichever registers GR1 to GR15 are used for saving other registers to memory generally have their contents restored from memory before executing any TB's because we generally assume that the registers GR1 to GR15 have valid global values when entering binary translation mode. Whichever set of registers is saved to memory upon entering BT mode, during this initial register spill, will be referred to as the "register pool," and registers in the register pool will be referred to as "pool registers." In set theory, the register pool is the universe of registers from which scratch registers may be selected. For simplicity, in the description below, it is assumed that the register pool includes only registers GR1 to GR15, unless specified otherwise. Restoring all pool registers and handling the NaT bits for these registers are handled in the same general manner as described above for the registers GR1 to GR15.

This method for saving registers to memory may also be implemented in other architectures that do not have multiple banks, such as the bank 0 and bank 1 of the IA-64 architecture, so long as the other architectures have one or more "trappable registers." A trappable register is a register for which a trap may be set up, so that if guest software attempts to access the trappable register, the trap is activated. Upon activation of the trap, the trappable register may be emulated, so that the guest software does not have access to the trappable register, but the guest software is executed (which includes emulation by binary translation or interpretation) as if it had access to the trappable register. The guest software is not allowed to use the trappable register, so that the trappable register is available for use by the VMM. When the VMM switches from direct execution mode to binary translation mode, the trappable register is used for address indirection to save another register to memory, so that the other register enters the register pool. Additional registers may also be saved to memory in the same manner using the one or more trappable registers. Thus, this aspect of the invention facilitates saving one or more registers to memory when entering binary translation mode in any system that requires indirect memory addressing for saving registers to memory, so long as the system includes one or more trappable registers.

A trappable register for the purpose of this invention should be interpreted broadly. An actual instruction that attempts to access the register need not necessarily be trappable, so long as some trap can be set up that can be used to prevent access to the register. For example, in the embodiment described above, instructions that attempt to access bank 0 registers are not trapped. Instead, instructions or interruptions that would cause the bank 0 registers to become active are used to trigger the emulation of the bank 0 registers. For example, the IA-64 architecture includes a bank switch instruction that causes the registers GR16 to GR31 to switch from bank 1 to bank 0, or vice versa. However, this instruction can only be executed at the greatest privilege level, and the guest software is not allowed to run at the greatest privilege level. So, if the guest software includes a bank switch instruction, an interruption occurs and the VMM emulates the bank switch instruction, without actually switching the banks. Subsequent guest instructions that access the registers GR16 to GR31 are not trapped, but they also aren't allowed to access the bank 0 registers. In the IA-64 architecture, the bank 0 registers GR16 to GR31 are trappable registers.

Global Value Status

In the preferred embodiment, one or more, and possibly all, of registers GR1 to GR15 and bank 1 registers GR16 to GR31 are saved to memory when the VMM enters binary translation mode. For the following discussion, we'll assume that all of the registers GR1 to GR15 are saved to memory, although this need not be the case. Also, the following discussion can also be applied to other registers, besides registers GR1 to GR15 and bank 1 GR16 to GR31, including registers from other microprocessor architectures. Now, just because the registers have been saved to memory does not mean that the registers are available for use as scratch registers. Another aspect of the invention relates to tracking and/or determining the status of registers to determine whether each register is available for use as a scratch register.

FIG. 6A illustrates different statuses the value of a register may have while in binary translation mode. The status of the register value is described as the global value status. The term "global" is used along with the term "local" to distinguish between register values that are only relevant within a TB (local) and those that are relevant outside of the TB (global). Thus, the "global value status" indicates the status of a value in a register, where the value may be relevant outside of a TB. As illustrated in FIG. 6A, a GR may have a status of valid and saved, with a notation of (V,S)=(1,1); valid and unsaved, with a notation of (V,S)=(1,0); and invalid and saved, with a notation of (V,S)=(0,1). When entering binary translation mode, it is assumed that all registers have valid global values. All of the registers are also saved at the beginning of binary translation mode, so the pool registers will all have a status of (V,S)=(1,1) prior to execution of the first TB. Also, a register should never have a status of invalid and not saved, (V,S)=(0,0). The only way to cause a register's global value status to be invalid is to use the register as a scratch register. But a register should never be used as a scratch register unless the contents of the register have been saved to memory.

FIG. 6B describes different actions that may be taken relative to a register while executing a TB. The possible actions include using whatever global value is already contained in the register prior to the execution of the TB ("Use"), defining a new global value that may be used after execution of the TB is completed ("Define"), using the register as a scratch register ("Scratch"), and saving the contents of the register to memory ("Save").

As an example of these TB actions, suppose that a TB has an instruction that adds the contents of GR2 to the contents of GR3 and stores the result in GR1. Suppose further that there are no prior instructions within the TB that relate to GR2 or GR3, and suppose that none of the registers GR1, GR2 and GR3 is used as a scratch register within the TB, so that each of these registers contains a global value. In this case, GR1 would be "Defined" within the TB, while GR2 and GR3 would be "Used" within the TB.

FIG. 6C illustrates a general concept that, for each action that may be taken relative to a register while executing a TB, one or more conditions may need to be satisfied by the global value status of the register before the action can be taken. FIG. 6C also illustrates another general concept that the action taken relative to a register while executing a TB may have one or more effects on the global value status of the register. Thus, prior to a TB, a GR has an input global value status, (Vi,Si). Depending on the action to be taken on a register, one or more conditions may need to be satisfied by the status of the register before the register is used. Once the action is taken on the register, one or more effects may occur relative to the status of the register, resulting in an output global value status, (Vo,So).

FIG. 6D specifies, for each of four possible actions, the condition(s) that must be met by the status of a register before the action may be taken, the effect(s) on the status of the register as a result of the action being taken, and the output global value status that results from the action being taken. Thus, a register that is Used during a TB must have a valid value coming into the TB, while it doesn't matter whether the contents of the register are saved to memory. Also, Using a register has no effect on the status of the register, so that the output status is the same as the input status, namely (Vo,So)=(Vi=1,Si). A register for which a global value is Defined within a TB need not have a valid global value nor be saved prior to executing the TB. The effect of a register value being Defined in a TB is that the resulting value is valid, but not saved, so that the output status is (Vo,So)=(1,0). A register can only be used as a Scratch register if its value is saved coming into the TB, while it doesn't matter whether the register contains a valid global value. Using a register as a Scratch register invalidates the global value status of the register, but the contents of the register remain saved from a global value perspective, resulting in an output status of (Vo,So)=(0,1). Finally, in order to Save the contents of a register during a TB, the register must contain a valid global value, but it doesn't matter whether or not the contents of the register have already been saved to memory. Saving the contents of a register to memory causes the status of the global value to be saved, so that the output status of a register that is Saved during a TB must be (Vo,So)=(1,1).

Figure 7:
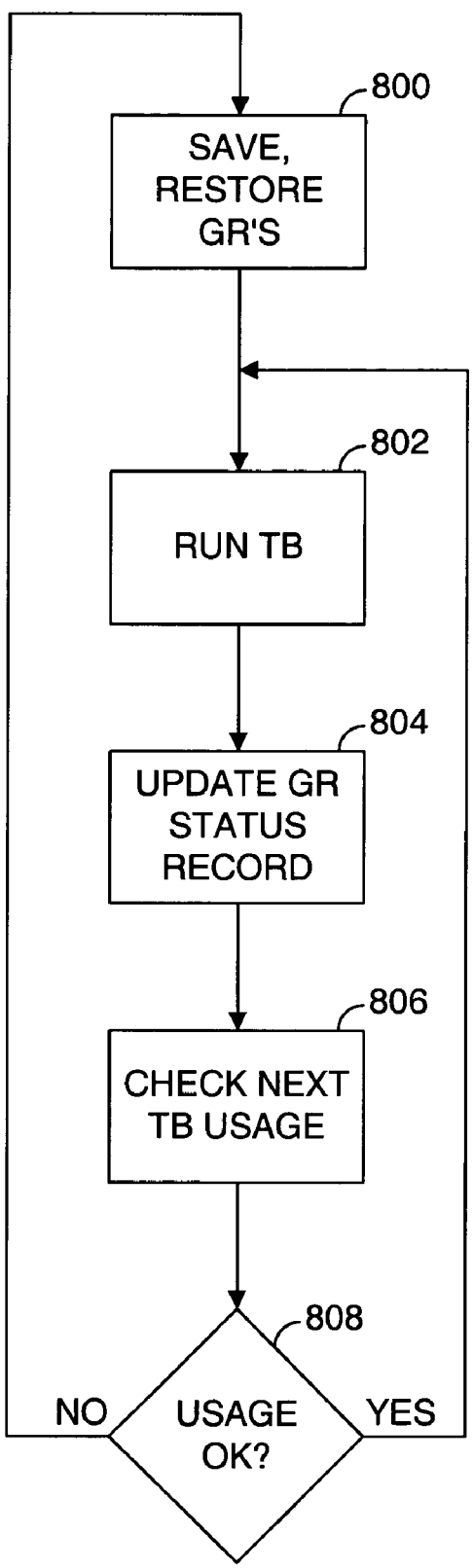
FIG. 7 illustrates a general method of the invention for managing registers in a binary translator.

FIG. 7 illustrates a general method for managing registers while a VMM is in binary translation mode. This method is yet another aspect of this invention. At a first step 800, the VMM saves one or more registers to memory to establish a register pool, such as the registers GR1 to GR15 and the bank 1 registers GR16 to GR31. This step may be performed by the methods described above relative to FIG. 5, in which registers GR1 to GR15 are saved to memory while the TB execution code 461 is still in an interrupt handler routine and bank 1 registers GR16 to GR31 are saved to memory after the TB execution code has returned from the interrupt handler. On the first pass through the method of FIG. 7, upon entering the BT mode, all of the pool registers are assumed to contain valid global values, so that there is no need to restore any global values from memory into any of the pool registers. On subsequent passes through the step 800, however, the contents of some pool registers may be saved to memory, while the contents of other pool registers may be restored from memory.

After the step 800, each of the pool registers has a global value status of (V,S)=(1,1), assuming that all of the pool registers have been either saved to memory or restored from memory. Referring to FIG. 6D, one can see that any of the four actions listed may be taken on any of the pool registers. There are no conditions for the four actions that are not satisfied by a global value status of (V,S)=(1,1). As a result, there is no such condition that could prevent a first TB from being executed. Accordingly, at a step 802, a first TB is executed.

Next, at a step 804, the VMM determines any effects on any of the pool registers that result from any actions taken during the first TB, and updates a record of the global value status for each of the pool registers accordingly. The global value status register 466, illustrated in FIG. 3, may be used to store this record of the global value status. As an example of updating the record of the global value status, if the register GR4 is Defined during the first TB, then the record is updated to indicate that the register GR4 has a global value status of (V,S)=(1,0).

Typically, in between execution of TB's, the VMM will check to see which of a number of possible actions needs to be taken next. The VMM may determine that it should switch to direct execution mode or to interpretation mode, or the VMM may determine that a new TB must be generated. In any of these cases, the method of FIG. 7 no longer applies. For purposes of describing the method of FIG. 7, suppose that the VMM determines that several TB's are to be executed, one after another. In this case, at the next step 806, the TB execution code 461 checks to see if the usage of registers within the next TB is compatible with the current global value status record. In effect, the TB execution code determines each action that is taken relative to each of the pool registers within the next TB, and determines whether the conditions for each of those actions are satisfied by the global value status of the respective register on which the action is to be taken. Thus, for example, suppose that GR4 was Defined in the prior TB, as described above, so that GR4's status is (V,S)=(1,0), and suppose that the next TB uses the register GR4 as a Scratch register. As indicated in FIG. 6D, using a register as a Scratch register requires an input status of (V,S)=(X,1). Because GR4 is not saved, as required by the next TB, the usage of the next TB is not compatible with the current global value status.

As shown at a decision step 808, if the usage of the next TB is compatible with the current global value status, the method returns to a step 802, and the next TB is executed. If the usage of the next TB is not compatible with the current global value status, the method returns to a step 800. At the step 800, the contents of one or more registers are either stored to memory or restored from memory. Preferably, for each register for which the contents are not already saved to memory, the TB execution code saves the contents of the register to memory, while for each register for which the contents are not valid, the TB execution code restores the contents of the register from memory. As described above, the status of a register should never be both invalid and unsaved. Thus, in the preferred embodiment, after the step 800, all of the pool registers will again have a status of (V,S)=(1,1).

In other embodiments, not all invalid registers are necessarily restored from memory and not all unsaved registers are necessarily saved to memory. At a minimum, however, the contents of registers must be saved to memory or restored from memory to an extent that is sufficient to make the usage of the next TB compatible with the newly achieved global value status. For example, in the example above, where GR4 has a status of (V,S)=(1,0) and the next TB uses GR4 as a scratch register, the register GR4 should be saved to memory, at a minimum, to allow the next TB to execute properly.

Saving registers at the step 800, after the initial pass through the loop of FIG. 7 and possibly instead of the method described above relative to FIG. 5 for the first pass through the loop of FIG. 7, may be performed in at least two different ways. First, the banks for the registers GR16 to GR31 may be switched, allowing the bank 0 registers to be used for the address indirection. As mentioned above, however, switching banks is relatively expensive in terms of microprocessor cycles. As a second alternative, if the record of the global value status of the registers can be used to determine one or more registers that are available for use as scratch registers, the identified registers may be used for the address indirection. After saving the registers that were unsaved, the contents of the registers that are invalid can be restored from memory, including the registers that were just used as scratch registers.

Again, after the step 800, the method of FIG. 7 proceeds to the step 802, and execution continues with the next TB. The method of FIG. 7 continues until the VMM determines that some other action should be taken, other than executing another TB, such as the other actions mentioned above, namely switching to direct execution mode or interpretation mode, or generating a new TB.

Figure 8A:
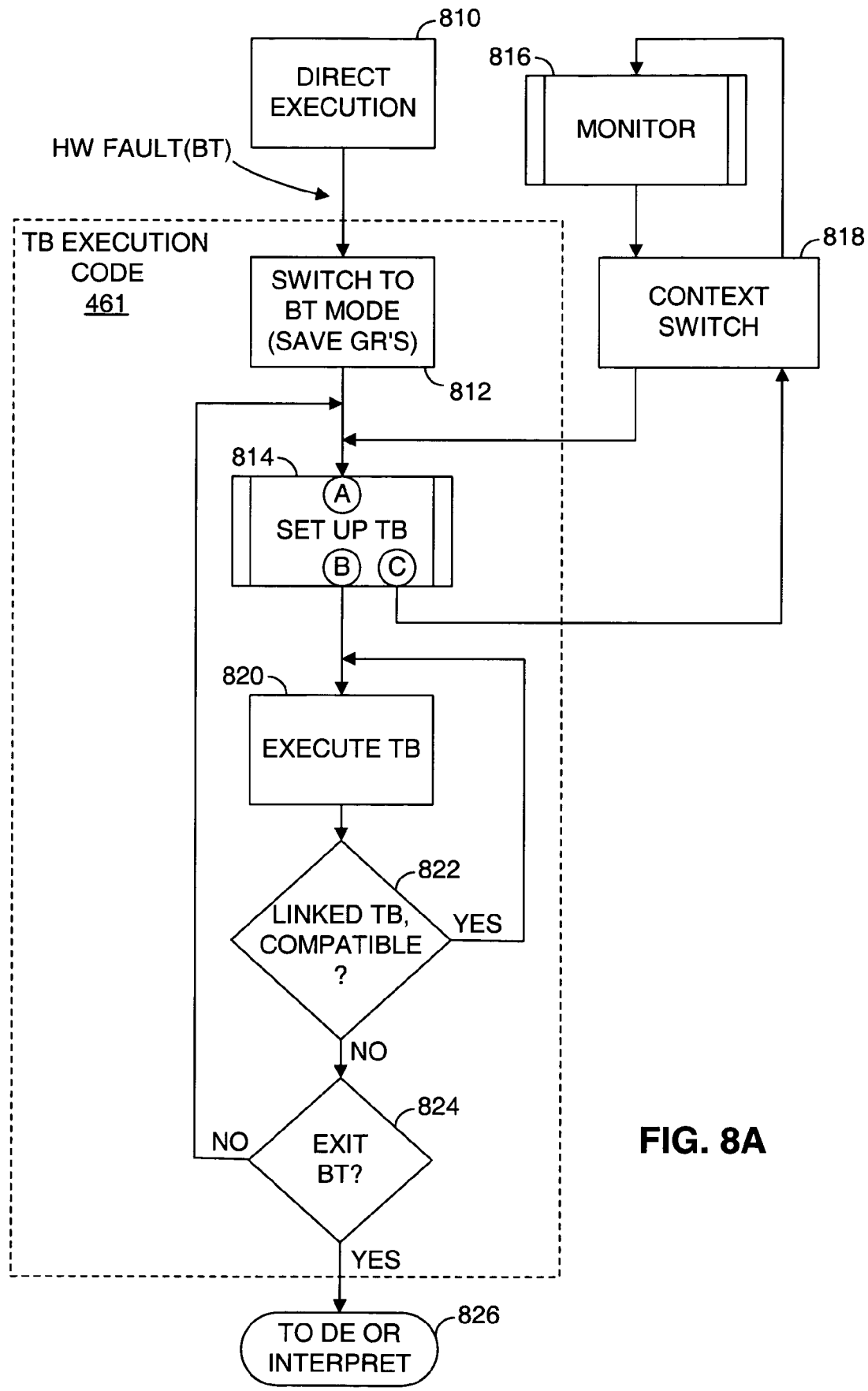
FIG. 8A illustrates a method of the invention for managing registers in a binary translator, according to one implementation in a specific virtual computer system.

FIG. 8A illustrates a more specific method for managing registers while a VMM is in binary translation mode, according to one implementation of the invention in a specific virtual computer system. The virtual computer system is based on the IA-64 architecture, as described above. The method begins at a step 810, when the VMM 400 is in direct execution mode. Suppose that an interruption occurs that causes the VMM to switch to binary translation mode. In this case, the method of FIG. 8A proceeds to a step 812. The step 812 is implemented in an interrupt handler routine.

At the step 812, the TB execution code 461 performs several steps to switch to the BT mode. These steps are dependent on the specific implementation, and may be readily determined by a person of skill in the art. Of particular relevance to this invention, however, the TB execution code preferably saves the registers GR1 to GR15 to memory according to the method described above relative to FIG. 5, while the interrupt handler routine is executing and the bank 0 registers GR16 to GR31 are active. Also as described above, the TB execution code may also save the bank 1 registers GR16 to GR31 to memory after the interrupt handler routine terminates and the bank 1 registers GR16 to GR31 become active again.

Next, the method proceeds to a step 814. At the step 814, the TB execution code attempts to find the next TB to be executed and determines whether the register usage of the next TB is compatible with the current global value status for the registers. The step 814 is illustrated in greater detail in FIG. 8B.

As illustrated in FIG. 8B, a method of step 814 begins at a point A, shown in an initial block labeled 814. The method proceeds to a step 828. At the step 828, the TB execution code 461 checks the TB directory cache 465 for a TB that has a source key that matches the current VM IP value and the current execution setting, as described above. If a matching TB is not found, the method of FIG. 8B proceeds to a point C and exits the method of FIG. 8B. As shown in the FIG. 8A, the point C, from the step 814, leads next to a step 818. If, at the step 828, a matching TB is found, the method of FIG. 8B proceeds to a step 830.

Figure 9A:
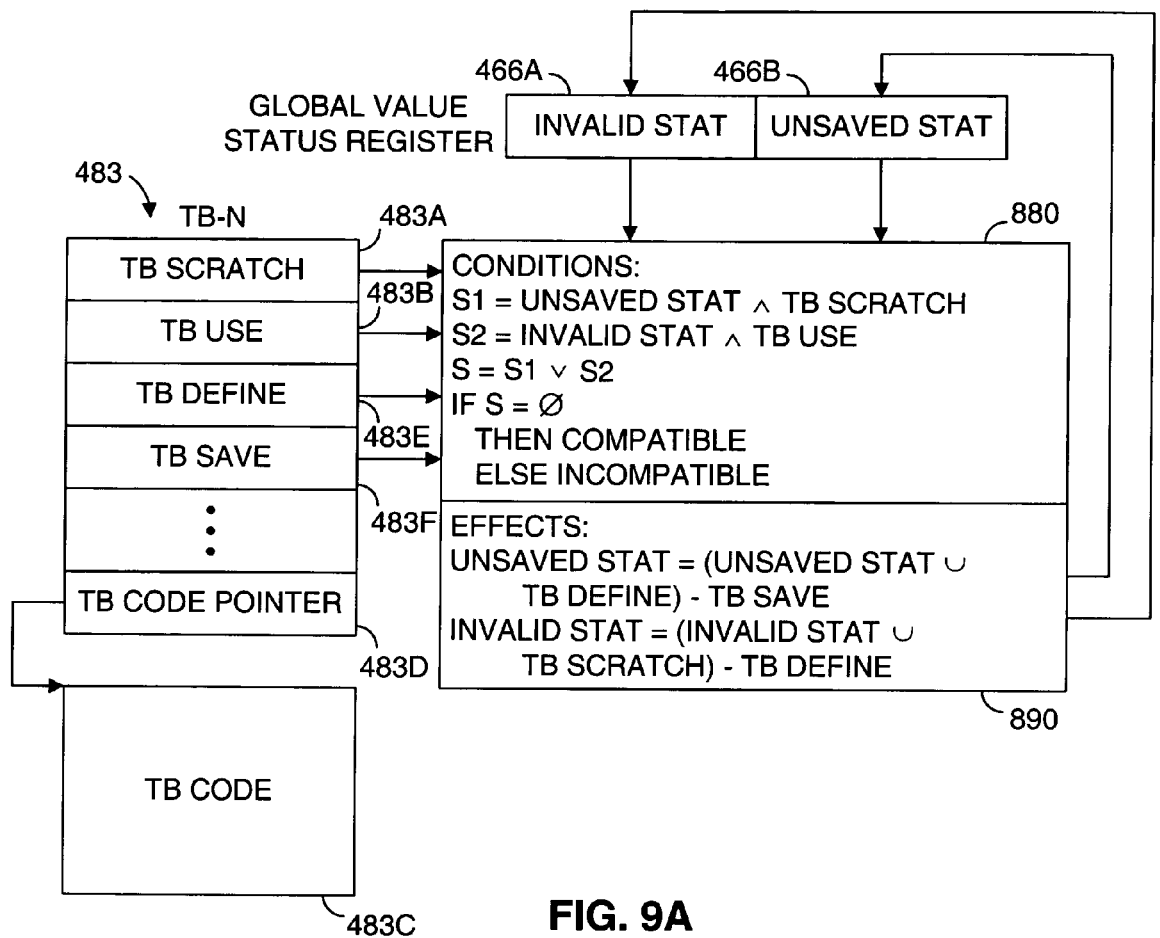
FIG. 9A illustrates a method for determining whether a translation block is compatible with a current global value status, as well as a method for updating the global value status.

At the step 830, the TB execution code determines whether the next TB, which was identified at the step 828, is compatible with the current global value status for the pool registers. A preferred method for determining whether the next TB is compatible with the current global value status is illustrated in FIG. 9A. FIG. 9A also illustrates a method for updating the record of the global value status for the pool registers. While the method of FIG. 9A for determining the compatibility of the next TB is performed by the TB execution code during the step 830, the same general method is also performed by other portions of the VMM 400, though, at other times.

Both methods of FIG. 9A involve the global value status register 466. In the preferred embodiment, the global value status register 466 is a 64-bit register, such as one of the general registers in the IA-64 architecture. The status register 466 is logically divided into a 32-bit first half 466A that indicates which of the pool registers contain invalid values and a second 32-bit half 466B that indicates which of the pool registers contain unsaved values. The first half 466A is referred to as the "Invalid Status register" while the second half 466B is referred to as the "Unsaved Status register." For the Invalid Status register 466A, the valid/invalid status of each of the pool registers is represented by a single bit, with a '1' indicating that the register has an invalid value and a '0' indicating that the register has a valid value. Because the Invalid Status register 466A comprises 32 bits, the valid/invalid status for each of the registers GR1 to GR15 and bank 1 registers GR16 to GR31 can all be indicated in the Invalid Status register 466A, with one bit to spare. Similarly, the Unsaved Status register 466B may be used to represent whether each of the pool registers GR1 to GR 15 and bank 1 registers GR16 to GR31 has been saved to memory, with a '1' indicating that the register is unsaved and a '0' indicating that the register has been saved.

FIG. 9A illustrates TB-N 483 as the next TB for which it will be determined whether the TB is compatible with the current global value status. In the preferred embodiment, each TB comprises both a data block and a code block. The pointer in a TB Directory entry points to the beginning of the data block for a TB. The data block, in turn, includes a pointer to the code block for the TB.

The data block includes one or more constants to indicate which actions are taken on which pool registers within the TB. In particular, in the preferred embodiment, the data block includes a first constant, referred to as a TB Scratch constant 483A, that indicates, for each of the pool registers, whether the register is used as a scratch register within the TB and a second constant, referred to as a TB Use constant 483B, that indicates, for each of the pool registers, whether the register is Used within the TB, where the term "Used" has the specific meaning described above. Similar to the Invalid Status register 466A and the Unsaved Status register 466B, the TB Scratch constant 483A and the TB Use constant 483B each uses one bit to correspond with each of the pool registers. For the TB Scratch constant 483A, a '1' indicates that the corresponding register is used as a scratch register and a '0' indicates that the corresponding register is not used as a scratch register. For the TB Used constant 483B, a '1' indicates that the corresponding register is Used and a '0' indicates that the corresponding register is not Used. The data block may also include other, similar constants, such as a TB Define constant 483E that indicates which pool registers are Defined within the TB and a TB Save constant 483F that indicates which pool registers are saved to memory within the TB. The data block may also include other data that is used within the code block. Finally, as shown in FIG. 9A, each data block also contains a TB code pointer 483D that points to the corresponding code block 483C, which includes the translated code that, when executed, emulates the corresponding guest code.

When the VMM needs to determine whether the next TB is compatible with the current global value status, the VMM retrieves the contents of the Invalid Status register 466A and the contents of the Unsaved Status register 466B from the global value status register 466. The VMM also retrieves the TB Scratch constant 483A and the TB Use constant 483B from the next TB. These four values, the Invalid Status 466A, the Unsaved Status 466B, the TB Scratch constant 483A and the TB Use constant 483B, can be considered to be representations of elements within four different sets, with a '1' indicating that the respective element is included within the set and a '0' indicating that the respective element is not included within the set. Thus, for example, if the bits in the Invalid Status register 466A corresponding to the registers GR1, GR2 and GR4 each has a value of '1,' then these registers GR1, GR2 and GR4 can be said to be contained in the set of registers having an Invalid Status. Similarly, if the bits in the TB Use constant 483B corresponding to the registers GR3, GR4 and GR5 each has a value of '1,' then these registers GR3, GR4 and GR5 can be said to be contained in the set of registers that are Used in the next TB.

A set of conditions 880 are defined in FIG. 9A for determining whether or not the next TB is compatible with the current global value status. These conditions are defined in terms of these sets, using set theory. S1 is a first intermediate set obtained by performing a logical "and" function between the Unsaved Status 466B and the TB Scratch constant 483A. S2 is a second intermediate set obtained by performing a logical "and" function between the Invalid Status 466A and the TB Use constant 483B. S is a third set obtained by performing a logical "or" function between the sets S1 and S2. If the set S is an empty set, then TB-N 483 is compatible with the current global value status. If the set S is not an empty set, then TB-N 483 is not compatible with the current global value status.

Figure 9B:
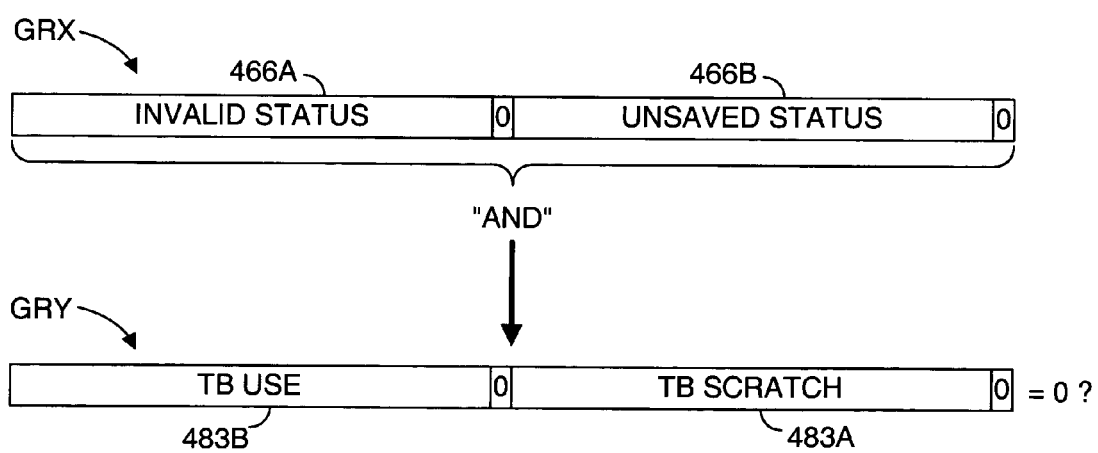
FIG. 9B illustrates a more detailed method for determining whether a translation block is compatible with the current global value status.

This method for evaluating these conditions may be easily performed in software. FIG. 9B illustrates one software implementation of this method. As described above, if there are 31 pool registers, the Invalid Status 466A and the Unsaved Status 466B may be maintained in a single general register, with a couple of bits left over. FIG. 9B shows the Invalid Status 466A and the Unsaved Status 466B maintained in a general register GRX, with the unused bits filled in with zeroes. Next, the TB Use constant 483B and the TB Scratch constant 483A are both loaded into another general register GRY, as also shown in FIG. 9B. Next, a logical "and" is performed between the register GRX and the register GRY, with the result being stored in the register GRY. Now, if the register GRY contains a zero, then the TB is compatible with the current global value status; otherwise, the TB is not compatible with the current status. Also, these steps may be combined in various other ways or implemented in different ways, depending on the programming environment. In one embodiment in the IA-64 architecture, the entire evaluation may be performed in a single assembly code instruction, if desired, based on the four input values of the Unsaved Status 466B, the TB Scratch constant 483A, the Invalid Status 466A and the TB Use constant 483B.

As mentioned above, FIG. 9A also illustrates a method in the preferred embodiment of the invention for updating the global value status register 466 after a TB has been executed. This second method of FIG. 9A is not performed during the step 830 of FIG. 8B. However, the method will nonetheless be described at this point. This method is actually performed during the execution of the TB in the preferred embodiment of the invention, as will be described below in connection with FIG. 10.

This second method of FIG. 9A is represented by a block 890. The same set notation and theory may be used for this method. First, the Unsaved Status 466B is combined as a union with the TB Define constant 483E. Then, the TB Save constant 483F is subtracted from the union, and the result is written back to the Unsaved Status 466B. The TB Define constant 483E and the TB Save constant 483F are similar to the TB Scratch constant 483A and the TB Use constant 483B, except that the TB Define constant indicates which pool registers are Defined within the TB, while the TB Save constant indicates which pool registers are Saved within the TB. The TB action of Saving registers to memory during the execution of a TB is optional. There need not be any saving within any TB. However, some saving of registers within a TB may improve the efficiency of the VMM 400. If registers are Saved within a TB, several different methods may be used to perform the Save. For example, a scratch register that is used during the TB may be used for the address indirection, either before the register is used as a scratch register, or after. The second step of the method of the block 890 involves combining the Invalid Status 466A as a union with the TB Scratch constant 483A. Next, the TB Define constant is subtracted from the union, with the result being written back to the Invalid Status 466A. Again, these set functions of the block 890 may easily be implemented in software using "bit op" instructions. In one embodiment using the IA-64 architecture, the functions can be implemented in two assembly code instructions. Each of the constants TB Scratch 483A, TB Use 483B, TB Define 483E and TB Save 483F may either be stored, such as within the TB data block, or they may be determined as needed, by evaluating the actions within the TB.

Returning to the description of FIG. 8B, as described above, at the step 830, the TB execution code 461 determines whether the next TB is compatible with the current global value status. If the next TB is compatible, the method of FIG. 8B proceeds to a step 834. If the next TB is not compatible, the method proceeds to a step 832. At the step 832, the TB execution code saves to memory or restores from memory one or more of the pool registers. In the preferred embodiment, all pool registers that have a status of unsaved are saved to memory, while all pool registers that have a status of invalid are restored from memory. Alternatively, less than all of these registers can be saved or restored. At a minimum, however, sufficient registers must be saved to memory and/or restored from memory to make the global value status compatible with the next TB. After the registers are saved and/or restored, global value status register 466 is updated accordingly, with a restored register now having a valid global value. After the step 832, the method of FIG. 8B proceeds to the step 834. At the step 834, the TB execution code 461 jumps directly to the next TB to be executed. Next, the method of FIG. 8B terminates at a point B.

Returning now to the description of FIG. 8A, after reaching the point B of the step 814, the method of FIG. 8A proceeds to a step 820. At the step 820, the next TB is executed, generally in a conventional manner. After the step 820, the method proceeds to a step 822. The step 822 actually consists of two determinations, whether there is a "link" to a next TB and whether the next TB is compatible with the current global value status. If there is a link to a next TB and the next TB is compatible, then the method of FIG. 8A returns to the step 820 to immediately execute the next TB. If there is no link to another TB, or the next TB is not compatible, then the method proceeds to a step 824. In the preferred embodiment, the step 822 is accomplished during the execution of the TB, along with the step 820.

Figure 10:
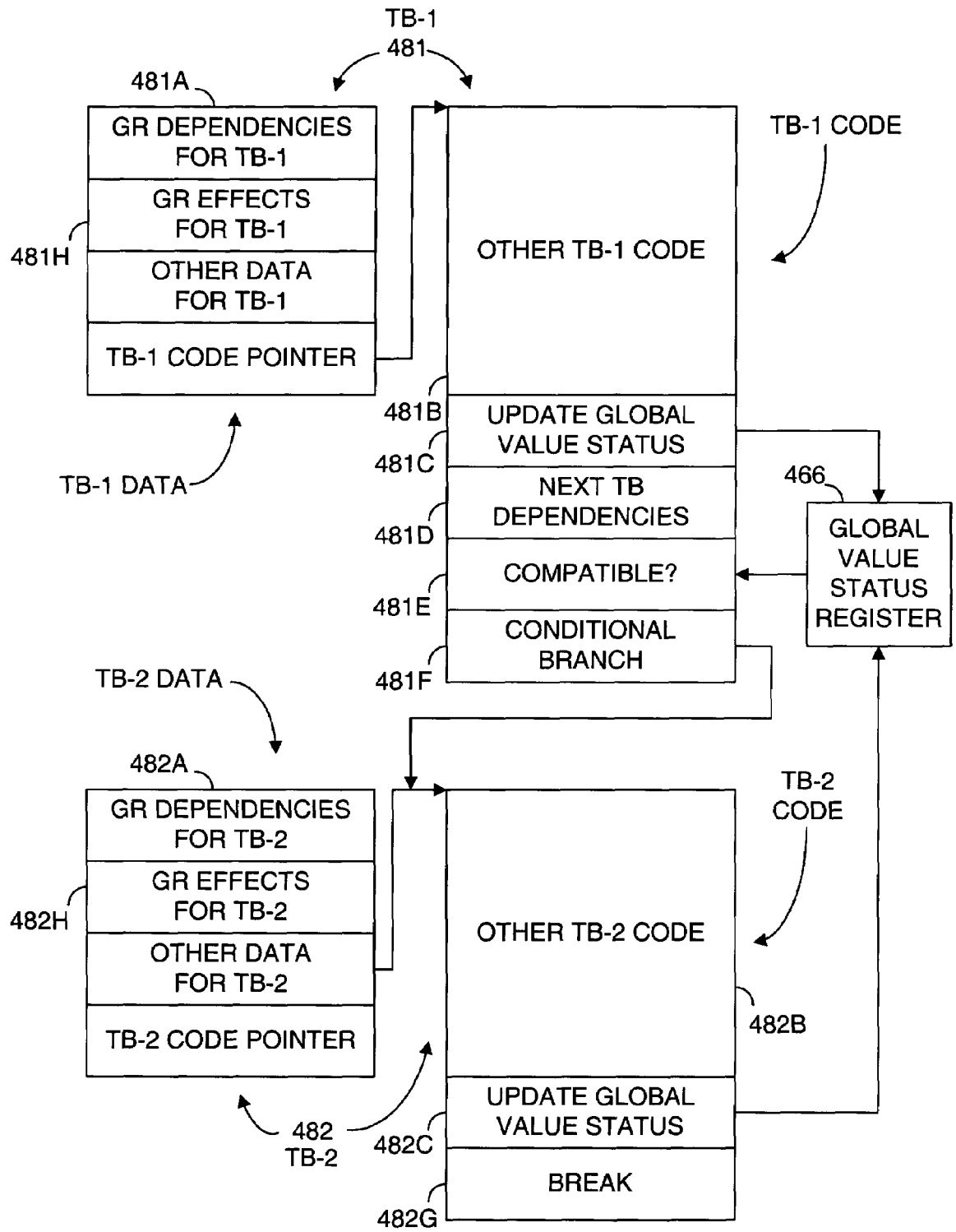
FIG. 10 illustrates programming steps that are appended to translation blocks in one implementation of the invention, in a specific virtual computer system.

To further illustrate and describe the steps 820 and 822, reference is made to FIG. 10, which illustrates a pair of linked TB's, with TB-1 481 being linked to TB-2 482, along with the global value status register 466. The data block of TB-1 includes a set of global register dependencies 481A. These may be the TB Scratch and TB Use constants illustrated in FIG. 9A. These dependencies are used to determine whether TB-1 is compatible with the current global value status during the method of the block 880 of FIG. 9A. Thus, the GR dependencies 481A are used during the step 830 of FIG. 8B.

The code block of TB-1 includes a set of substantive TB-1 code 481B that emulates the corresponding guest instructions, including some target instructions that may use one or more of the general registers as scratch registers. The TB-1 code may also Use one or more general registers, Define one or more general registers or Save one or more general registers to memory, as those terms are defined above. The TB-1 code 481B is executed during the step 820 of FIG. 8A.

Next, the TB-1 code block includes instructions 481C to implement the method of block 890 in FIG. 9A to update the global value status register 466. This step may be performed using a set of global register effects 481H that may also be included in the data block of TB-1. In particular, the global register effects 481H may include the TB Define and TB Save constants illustrated in FIG. 9A. Next, at a block 481D, TB-1 determines the GR dependencies for the next TB to be executed after TB-1, in this case TB-2 482. The GR dependencies again may be the TB Scratch constant and the TB Use constant for TB-2. The GR dependencies for the next TB may be provided as constants in TB-1, or they may be determined by reference to the data block of TB-2.

The GR dependencies determined at the block 481D are used at a block 481E to determine whether the next block TB-2 is compatible with the newly updated global value status. As shown in FIG. 10, the block 481E also reads the global value status register 466 to make this determination. This determination is also made according to the method of the block 880 of FIG. 9A.

Next, TB-1 contains a conditional branch 481F. If the next TB, TB-2, is compatible with the global value status, then execution branches to TB-2. This branch corresponds to the path returning to the step 820 from the step 822 in FIG. 8A, based on a determination that there is a link to the next TB and that the next TB is compatible with the current global value status.

In this case, the steps 820 and 822 are performed again, this time on TB-2. A set of GR dependencies 482A for TB-2 are the same as the GR dependencies 481A, except that they are for TB-2. Also, a set of GR effects 482H for TB-2 are the same as the GR effects 481H, except that they are for TB-2. A set of TB-2 code 482B is executed during the step 820. Next, a set of instructions 482C updates the global value status register 466 in the same manner as described above relative to the block 481C. At a block 482G, a break instruction is encountered and execution of TB-2 terminates. TB-2 is not linked to a next TB. Encountering a break instruction instead of linking instructions, such as the blocks 481D, 481E and 481F, is functionally equivalent to determining that there is no linked TB at the step 822 of FIG. 8A. Upon encountering the break instruction at the block 482G, execution branches to a point that performs the step 824 of FIG. 8A. This branch corresponds to the path from the step 822 to the step 824 in FIG. 8A, in the event that there is no link to another TB.

Referring again to the block 481F of TB-1, if TB-2 is not compatible with the current global value status, execution branches someplace other than the next TB-2, to a point that performs the step 824 of FIG. 8A. Thus, this branch corresponds to the path from the step 822 to the step 824 in FIG. 8A, in the event that the next TB is not compatible with the current global value status.

In any case, the method of FIG. 8A eventually proceeds to the step 824. At the step 824, the TB execution code 461 determines whether execution within the binary translation mode should be terminated. A number of different criteria may be used to determine when binary translation mode should be terminated. In very general terms, if execution can safely return to direct execution mode or if execution must switch to interpretation mode for some reason, binary translation mode should be terminated. If binary translation mode is not terminated, the method of FIG. 8A returns to the step 814 to try to find a next TB in the TB directory cache 465. If binary translation mode is terminated, the method proceeds to the terminal step 826, and execution switches to either direct execution mode or to interpretation mode.

As described above, the point C from the step 814 in FIG. 8A leads to the step 818. This point is reached when the TB execution code 461 does not find a TB in the TB directory cache 465 that has a source key that matches the current VM IP value and the current execution setting. At the step 818, a context switch is performed to switch to the high-level monitor code 470. Next, the method of FIG. 8A proceeds to a step 816. The step 816 implements a method within the monitor code for either finding an existing TB or generating a new one that is to be executed next, and placing an entry for the TB into the TB directory cache. This method is still part of the binary translation mode, and is described below with reference to FIG. 8C. After the step 816, the method of FIG. 8A returns to the step 818. Another context switch is performed, this time from the monitor code to the low-level TB execution code 461. Next, the method of FIG. 8A returns again to the step 814. This time, at the step 814, the TB execution code will find a matching TB in the TB directory cache and the method will proceed to the step 820, where the matching TB will be executed, possibly after saving and/or restoring GR's at the step 832 of FIG. 8B.

The method of the monitor code, illustrated in FIG. 8C, for finding a matching TB or generating a new TB begins at an initial step labeled 816. Next, at a step 836, the monitor code checks the TB directory 474 for an entry for a TB that has a source key that matches the current VM IP value and execution settings. The TB directory has entries for every TB within the translation cache 463, so, if a match is not found in the TB directory, then a matching TB does not exist. If a matching TB is found, the method of FIG. 8C proceeds to a step 840, otherwise, the method proceeds to a step 838.

At the step 838, the monitor code uses the TB generator 472 to generate a new TB for the next set of one or more guest instructions, based on the current execution settings. If possible, the new TB is created so that the actions that are taken within the new TB are compatible with the current global value status. For example, if a scratch register is needed in the new TB, the global value status is consulted to determine a GR that is currently available for use as a scratch register. Also, register usage compatibility is considered when determining when the new TB should be terminated. For example, if there are no more GR's available for use as scratch registers and the next guest instruction due to be translated would require the use of a scratch register, then the new TB may be terminated before translating that next guest instruction, to preserve TB compatibility. Once the new TB is created, the monitor code then creates an entry in both the TB directory 474 and the TB directory cache 465 containing the source key and translation cache pointer for the new TB. After the step 838, the method proceeds to the step 840.

At the step 840, the monitor code determines whether the next TB to be executed, which was either found at the step 836 or created at the step 838, may be linked to a prior TB, just like TB-1 and TB-2 are linked, as illustrated in FIG. 10. This depends initially on the mode in which guest instructions have been most recently executed or emulated prior to reaching the step 840. If no TB's have been executed so far since the VMM entered the binary translation mode from either the direct execution mode or the interpretation mode, then there is no prior TB to which the next TB may be linked. If, on the other hand, a TB has been executed since entering the binary translation mode from either the direct execution mode or the interpretation mode and before reaching the step 840, then it is possible that the prior TB may be linked to the next TB. Next, the monitor code determines whether the next TB is compatible with the current global value status. The monitor code may already know this information if it just generated the TB at the step 838, or the monitor code may perform the method described above relative to the step 830 of FIG. 8B to determine the compatibility of the next TB. If there is a prior TB and the next TB is compatible with the current global value status, then the method of FIG. 8C proceeds to a step 842. Otherwise, the method proceeds to a terminal step 844. At the step 842, the monitor code creates a patch at the end of the prior TB to link it to the next TB to be executed. The patch is equivalent to the instructions of the blocks 481D, 481E and 481F of FIG. 10. In this manner, the next time the prior TB is executed, execution can branch immediately to the next TB, if register compatibility exists again the next time around. After the step 842, the method proceeds to the step 844. The method of FIG. 8C and step 816 ends at the step 844.

Figure 11:
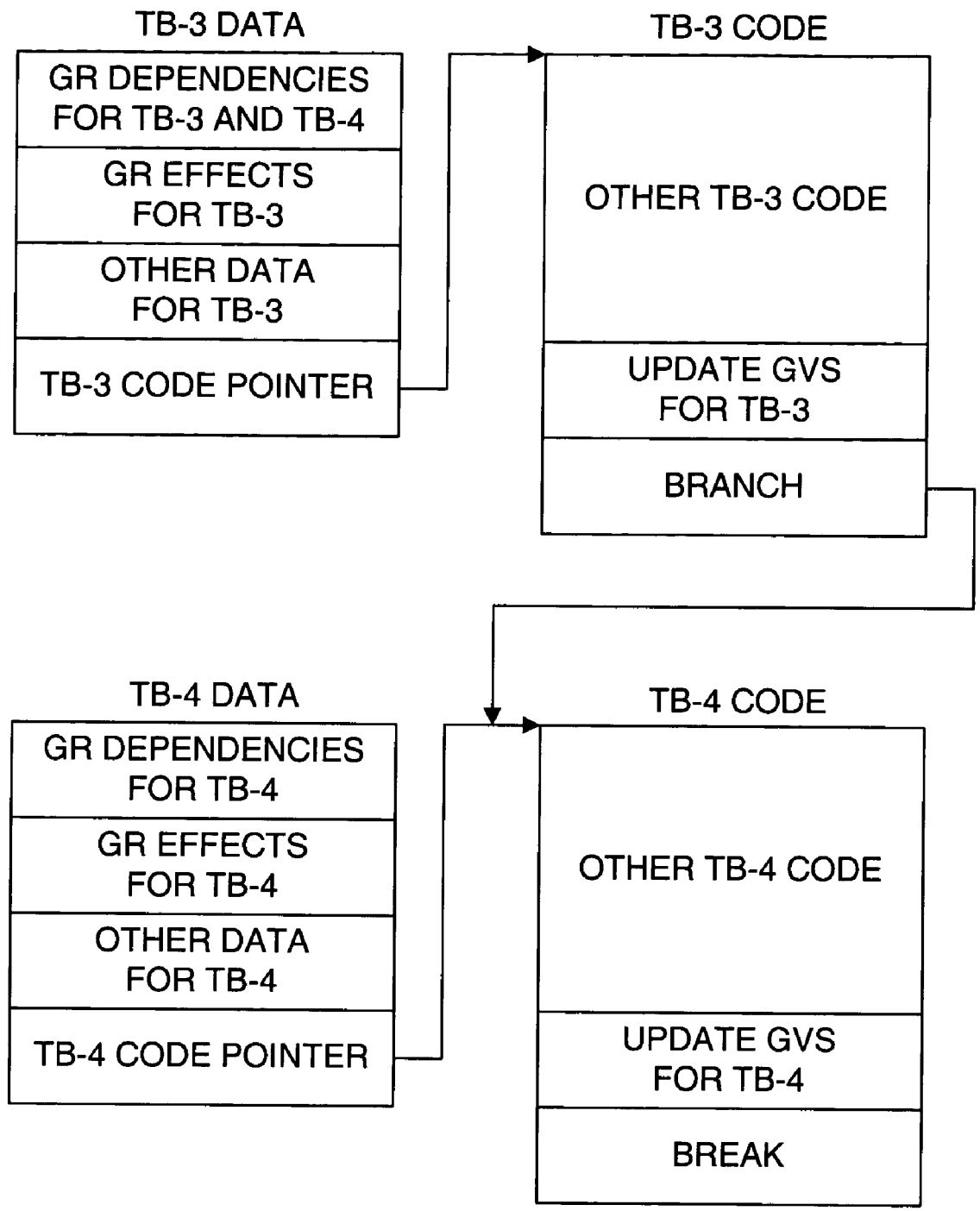
FIG. 11 illustrates alternative programming steps that are appended to translation blocks in an implementation of the invention, in a specific virtual computer system.

As an alternative to the patch described above for linking the prior and next TB's, if there is no need for a conditional branch between the prior TB and the next TB, then the prior TB and the next TB may be linked together in a manner that avoids the test for compatibility before proceeding from the prior TB to the next TB. FIG. 11 illustrates this alternative approach, with the prior TB being a TB-3 and the next TB being a TB-4. The data block of TB-3 includes the GR dependencies for both TB-3 and TB-4. In the preferred embodiment, this includes a TB Scratch constant, which indicates which registers are used as scratch registers in either TB-3 or TB-4, and a TB Use constant, which indicates which registers are Used in either TB-3 or TB-4. In this way, when TB-3 is the next TB to be executed and a determination must be made whether TB-3 is compatible with the global value status, the determination can actually be made relative to both TB-3 and TB-4. In other words, if executing both TB-3 and TB-4 is compatible with the global value status, then execution of TB-3 may proceed, followed by the execution of TB-4. Otherwise, additional registers are saved to memory and/or restored from memory to enable both TB-3 and TB-4 to be executed. The code block for TB-3 begins with the substantive code for the block. Next, the global value status register 466 is updated with respect to actions that were taken in TB-3. This may be done using the GR effects for TB-3 that may also be stored in the data block for TB-3. This may include a TB Define constant, which indicates which registers are Defined in TB-3, and a TB Save constant, which indicates which registers are Saved in TB-3. Next, execution branches directly to TB-4, without any test for compatibility with the global value status.

The data block for TB-4 includes the GR dependencies for TB-4. Including the GR dependencies for TB-4 here, as well as in the data block of TB-3 allows for branches directly to TB-4, without having to first execute TB-3. In the case of a branch from some place other than TB-3, only the GR dependencies for TB-4 need to be considered in determining global value status compatibility. In the case that TB-3 is executed immediately before TB-4, the GR dependencies for TB-4 are ignored when beginning to execute TB-4 because compatibility for TB-4 has already been confirmed. The code block of TB-4 includes the substantive code for the block. Next, TB-4 updates the global value status register 466 with respect to actions that were taken in TB-4, using the GR effects for TB-4 that are also included in the data block for TB-4. TB-4 may then end with a break instruction or with instructions that link TB-4 to another TB.

One variation on the patching technique illustrated in FIG. 11 is to hold off on attempting to find a series of TBs that may be linked together in this way until the BT engine 462 is executing TBs and identifies a particular trace, or sequence of TBs, including possibly a loop, that is executed relatively often. Once such a sequence of TBs is identified, the patching technique of FIG. 11 may be applied to optimize the execution of the sequence, along with other possible trace-based dynamic binary optimization techniques. Applying optimizations at runtime, on selected TBs that are executed more frequently, may lead to better overall performance from the BT engine.

As another option in implementing the invention, the TB generator 472 may generate multiple TBs having the same source key, including the same IP value and the same flag settings (if flag settings are used), but using different scratch registers, or possibly Saving different registers to memory. These multiple TBs having the same source key are loaded into the translation cache 463, with corresponding entries in the TB directory cache 465. Now, when the TB execution code 461 looks for a next TB to be executed, the execution code may find multiple entries in the TB directory cache having matching source keys. The execution code may check each of these TBs, one at a time, to determine if any of them are compatible with the current global value status. One or more of the TBs may be compatible, while one or more other TBs may not be compatible because of the different usage of scratch registers and the difference in Saving registers. For example, suppose that register GR4 is currently unsaved, so it cannot be used as a scratch register, but register GR5 is saved. Suppose further that a first TB uses register GR4 as a scratch register and a second TB uses register GR5 as a scratch register. In this case, the execution code can select the second TB for execution. The execution code may select a compatible TB to be the next one for execution in any manner, including simply taking the first one that is determined to be compatible.

The preferred embodiment has been described in terms of a particular implementation in a particular virtual computer system. A person of skill in the art will recognize that the invention may be implemented in numerous other ways, both in the same virtual computer system, and in a wide variety of other virtual computer systems. Numerous modifications can be made to the preferred embodiment described above. For example, when saving registers upon entering binary translation mode, a fewer number of registers, including just one register, may be saved while the TB execution code is in the interrupt handler mode, and the remainder of the registers may be saved after returning from the interrupt handler mode. Also, various other combinations of global value status data and general register dependency data are also possible, along with different techniques for updating the global value status data and for determining whether the actions within a TB are compatible with the current global value status. Also, the possible formats for the structures of a series of linked TB's may vary widely from those illustrated in FIGS. 10 and 11. Also, the sequence of steps illustrated in FIGS. 8A, 8B and 8C can vary significantly.

What is claimed is:

1. A method of emulating guest instructions using binary translation in a virtual computer system, the virtual computer system having a binary translation mode and a direct execution mode, the virtual computer system switching from the direct execution mode to the binary translation mode in response to an interruption, the computer system permitting only indirect memory addressing when saving registers to memory, the computer system having a first set of registers that has two banks, with a first bank generally being active when the computer system is executing an interrupt handler and a second bank generally being active when the first bank is inactive, and a second set of registers having only a single bank, the method comprising:

in response to an interruption that causes a switch from direct execution mode to binary translation mode, while the computer system is still executing the interrupt handler and the first bank of the first set of registers is still active, using one or more of the registers from the first set of registers for address Indirection and saving to memory one or more of the registers from the second set of registers;

performing the following steps one or more times to execute one or more blocks of translated code:

identifying a translation block as the next translation block to be executed;
determining one or more dependencies of the next translation block relating to whether the contents of one or more registers are valid or whether the contents of one or more registers are saved to memory;
if a dependency of the next translation block is not satisfied, saving one or more registers to memory or restoring one or more registers from memory to satisfy the dependency; and
executing the next translation block; and
returning to direct execution mode.

2. The method of claim 1, wherein the step of saving to memory one or more of the registers from the second set of registers is performed by a sequence of instructions, with each instruction from the sequence saving a single register to memory, and with the execution of each instruction depending on a predefined condition.

3. The method of claim 1, wherein a first dependency of the next translation block requires that the contents of a first register be saved to memory.

4. The method of claim 3, wherein the first dependency results from the first register being used as a scratch register in the next translation block.

5. The method of claim 1, wherein a second dependency of the next translation block requires that the contents of a second register be valid.

6. The method of claim 5, wherein the second dependency results from the second register being used within the next translation block without previously being defined in the next translation block.

7. The method of claim 5, wherein the second dependency results from the second register being saved to memory within the next translation block.

8. The method of claim 1, further comprising a step of checking one or more stored status values to determine whether a dependency is satisfied, the stored status values indicating whether the contents of one or more registers are valid and whether the contents of one or more registers are saved to memory.

9. The method of claim 8, further comprising a step of updating the stored status values after the determination of whether the dependency is satisfied based on one or more actions that are taken in the next translation block relative to the one or more registers.

10. The method of claim 9, wherein the one or more actions taken In the next translation block are selected from a group of (a) defining the contents of a register, (b) using a register as a scratch register and (c) saving the contents of a register to memory.

11. A computer program embodied in a tangible storage medium, the computer program being executable in a virtual computer system to execute binary translation code to emulate the execution of guest code, the computer system comprising a set of registers, the computer program comprising:
a plurality of translation blocks of translated code; and
a translation block execution routine, the execution routine performing the following functions to execute binary translation code:
identifying a next translation block to be executed;
determining a dependency between actions that are performed within the next translation block to be executed and the set of registers;
determining whether a current state of the set of registers satisfies the dependency;
if the current state of the set of registers does not satisfy the dependency, taking one or more actions with respect to one or more of the registers to alter the current state of the set of registers to satisfy the dependency and then executing the next translation block; and
if the current state of the set of registers does satisfy the dependency, executing the next translation block.

12. The computer program of claim 11, further comprising a translation cache for storing the plurality of translation blocks and a translation block directory cache for storing entries identifying a plurality of locations of the translation blocks within the translation cache.

13. The computer program of claim 12, further comprising a direct execution engine and a monitor code, the monitor code further comprising an interpreter and a translation block generator, the translation block generator for generating new translation blocks.

14. The computer program of claim 12, wherein each directory cache entry includes an instruction pointer value, and the execution routine identifies a next translation block to be executed by identifying an entry in the directory cache that matches a current guest instruction pointer value, and by referring to a pointer to the next translation block, which is also included in the directory cache entry.

15. The computer program of claim 14, wherein each directory cache entry further includes a plurality of flag settings for indicating an execution setting, and the execution routine identifies a next translation block to be executed by further identifying an entry in the directory cache for which the flag settings match a current executing setting.

16. The computer program of claim 11, wherein any of a first plurality of translation blocks could be selected as the next translation block to be executed to emulate a next set of one or more guest code instructions, with each of the first plurality of translation blocks using the set of registers in a different manner, and, in identifying the next translation block to be executed, the execution routine attempts to find one of the first plurality of translation blocks for which the use of the set of registers is compatible with the current state of the set of registers.

17. The computer program of claim 11, wherein the computer program is executable in a virtual computer system comprising a virtual machine having an IA-64 architecture running on a physical hardware system also having an IA-64architecture.

18. The computer program of claim 11, wherein the dependency requires that a first register be saved to memory because the first register is used as a scratch register in the next translation block, wherein the current state of the registers includes an indication as to whether the first register is saved to memory, and wherein an action that is taken if the current state of the registers does not satisfy the dependency is to save the first register to memory.

19. The computer program of claim 11, further comprising a global value status register for storing the current state of the set of registers.

20. The computer program of claim 19, wherein the set of registers is a register pool that comprises a plurality of registers that may be used as scratch registers within the next translation block, and wherein the global value status register comprises a first plurality of bits for indicating whether the contents of each of the registers in the register pool are saved to memory, using one bit for each register in the register pool, and a second plurality of bits for indicating whether the contents of each of the registers in the register pool are valid, using one bit for each register in the register pool.

21. The computer program of claim 20, wherein in the first plurality of bits, a set bit indicates that the contents of a corresponding register in the register pool have not been saved to memory, and wherein in the second plurality of bits, a set bit indicates that the contents of a corresponding register In the register pool are not valid.

22. The computer program of claim 21, wherein the step of determining whether the current state of the set of registers satisfies the dependency is accomplished by performing a logical "and" operation between the global value status register and a register usage value, the register usage value comprising a third plurality of bits that corresponds to the first plurality of bits of the global value status register, but that indicates whether the corresponding registers in the register pool are used as scratch registers in the next translation block, the register usage value further comprising a fourth plurality of bits that corresponds to the second plurality of bits of the global value status register, but that indicates whether the corresponding registers in the register pool are used in the next translation block without first being defined in the next translation block, with a result of zero from the "and" operation indicating that the current state of the registers satisfies the dependency.

23. A computer program embodied in a tangible storage medium, the computer program being executable in a virtual computer system to emulate the execution of guest instructions, the computer system comprising a set of registers, the computer program comprising:
    a first translation block of translated code; and
    a second translation block of translated code,
    wherein the first translation block is to be executed, followed by the second translation block,
    wherein the first translation block contains instructions for performing the following functions:
        emulating one or more guest instructions;
        updating a status of the contents of the set of registers based on actions taken within the first translation block;
        determining a dependency Been one or more actions to be taken in the second translation block and the status of the contents of the set of registers;
        if the dependency is satisfied by the status of the contents of the registers, proceeding to the second translation block for execution;
        if the dependency is not satisfied by the status of the contents of the registers, taking another action in response to the dependency not being satisfied, instead of immediately executing the second translation block, and
    wherein the second translation block emulates one or more additional guest instructions.

24. The computer program of claim 23 wherein if the dependency is not satisfied, the computer program branches to another section of code to take one or more actions to satisfy the dependency.

25. The computer program of claim 24 wherein the one or more actions taken to satisfy the dependency includes saving the contents of a register to memory.

26. The computer program of claim 23, wherein the second translation block also contains instructions for updating the status of the contents of the set of registers based on actions taken within the second translation block.

27. The computer program of claim 23, wherein the status of the contents of the set of registers is maintained in a global value status register and indicates whether the contents of each of the registers are saved to memory and whether the contents of each of the registers are valid.

28. The computer program of claim 23, wherein the second translation block further comprises a second data block that includes a dependencies constant for indicating one or more dependencies between the actions to be taken in the second translation block and the status of the contents of the set of registers, and wherein the instructions in the first translation block access the dependencies constant during the step of determining the dependency.

29. The computer program of claim 28, wherein the second data block further includes an effects constant for indicating one or more effects on the set of registers from the one or more actions that are taken in the second translation block, the effects constant being used to update the status of the contents of the set of registers based on the actions taken in the second translation block.

30. The computer program of claim 23, further comprising a translation block execution routine containing instructions that perform the following functions prior to execution of the first translation block:
    determining a first dependency between one or more actions to be taken in the first translation block and the status of the contents of the set of registers;
    if the dependency is not satisfied by the status of the contents of the registers, taking one or more actions relative to the set of registers to satisfy the dependency; and
    proceeding to the first translation block for execution.

31. A computer program embodied in a storage medium, the computer program being executable in a virtual computer system to emulate the execution of guest instructions, the computer system comprising a set of registers, the computer program comprising:
    a translation block execution routine;
    a first translation block of translated code; and
    a second translation block of translated code,
    wherein the first translation block contains instructions for performing the following functions:
        emulating one or more guest instructions;
        updating a status of the contents of the set of registers based on actions taken within the first translation block; and
        proceeding to the second translation block for execution,
    wherein the second translation block emulates one or more additional guest instructions, and
    wherein the execution routine contains instructions for performing the following functions:
        determining whether to execute the first translation block followed by the second translation block or whether to execute only the second translation block;
        if a determination is made to execute the first and second translation blocks, further performing the following functions:
            determining a first dependency between one or more actions to be taken in the first or second translation blocks and the status of the contents of the set of registers; and
            if the first dependency is satisfied by the status of the contents of the registers, proceeding to the first translation block for execution; or
        if a determination is made to execute only the second translation block, further performing the following functions:

determining a second dependency between one or more actions to be taken in the second translation block and the status of the contents of the set of registers; and if the second dependency is satisfied by the status of the contents of the registers, proceeding to the second translation block for execution.

32. The computer program of claim 31, wherein if the first dependency is not satisfied, the computer program branches to another section of code and takes one or more actions relative to the set of registers to satisfy the first dependency, or if the second dependency is not satisfied, the computer program branches to the other section of code and takes one or more actions relative to the set of registers to satisfy the second dependency.

33. The computer program of claim 31, wherein the first translation block further comprises a first data block that includes a first dependencies constant for indicating one or more dependencies between the actions to be taken in the first and second translation blocks and the status of the contents of the set of registers and a first effects constant for indicating one or more effects on the set of registers from the one or more actions that are taken in the first translation block, and wherein the second translation block further comprises a second data block that includes a second dependencies constant for indicating one or more dependencies between the actions to be taken in the second translation block and the status of the contents of the set of registers and a second effects constant for indicating one or more effects on the set of registers from the one or more actions that are taken in the second translation block.

34. A method of executing a first block of one or more translated instructions followed by a second block of one or more translated instructions during a binary translation mode of a virtual computer system, where the second block of translated instructions corresponds to a second set of one or more guest instructions that is due to be executed immediately after a first set of one or more guest instructions that corresponds to the first block of translated instructions, the method comprising:

executing the first block of translated instructions;

determining a status for one or more registers within a set of registers;

identifying a dependency between one or more actions that are performed within the second block of translated instructions and the status of one or more registers within the set of registers, so that the validity of the contents of the one or more registers may be corrupted if the second block of translated instructions is executed when the dependency is not satisfied;

if the dependency is not satisfied, taking an action relative to one or more of the registers to alter the status of the registers to a state that satisfies the dependency and then executing the second block of translated instructions; and if the dependency is satisfied, executing the second block of translated instructions.

35. The method of claim 34, wherein the status for the one or more registers includes whether the contents of the registers are saved to memory, wherein an action that is performed during the second block of translated instructions is to use a first register as a scratch register, wherein the dependency that is identified requires that the first register be saved to memory because the first register is used as a scratch register, and wherein if the dependency is not satisfied because the first register is not saved to memory, the action that is taken to alter the status of the registers to a state that satisfies the dependency is to save the first register to memory.

36. The method of claim 34, wherein the status for the one or more registers is maintained in a global value status register, and wherein the status maintained includes whether the contents of a register are saved to memory and whether the contents of a register are valid.

37. The computer program of claim 23 wherein the second translation block is executed after taking the other action in response to the dependency not being satisfied.

* * * * *

UNITED STATES PATENT AND TRADEMARK OFFICE
CERTIFICATE OF CORRECTION

PATENT NO.        : 7,260,815 B1
APPLICATION NO.   : 10/610218
DATED             : August 21, 2007
INVENTOR(S)       : Xiaoxin Chen et al.

Page 1 of 1

It is certified that error appears in the above-identified patent and that said Letters Patent is hereby corrected as shown below:

1. Title page item (73) Assignee, change

"VMWare, Inc., Palo Alto, CA (US)"

to

--VMware, Inc., Palo Alto, CA (US)--

Signed and Sealed this

Sixth Day of October, 2009

David J. Kappos
*Director of the United States Patent and Trademark Office*